United States Patent [19]
Paterson et al.

[11] Patent Number: 5,410,955
[45] Date of Patent: May 2, 1995

[54] PEAR PROCESSING METHOD AND APPARATUS

[75] Inventors: Douglas F. Paterson, Colorado Springs, Colo.; Konrad Meissner, Lafayette, Calif.; William V. Redd, Broomfield, Colo.; Anthony D. Oliver, Rye, Colo.; Michael S. Lipford, Pueblo, Colo.; Don A. Perry, Manitou Springs, Colo.; C. Richard Schoner, Palm Desert, Calif.

[73] Assignee: Atlas Pacific Engineering Company, Pueblo, Colo.

[21] Appl. No.: 238,522

[22] Filed: May 5, 1994

Related U.S. Application Data

[62] Division of Ser. No. 35,667, Mar. 23, 1993.

[51] Int. Cl.$^6$ ............................................. A23N 4/22
[52] U.S. Cl. ............................................. 99/543; 99/545
[58] Field of Search .............................. 99/537–545; 83/161, 167, 870, 874, 932

[56] References Cited

U.S. PATENT DOCUMENTS

| | | | |
|---|---|---|---|
| 1,451,571 | 4/1923 | Gay | 99/543 |
| 2,097,170 | 10/1937 | Wilson | 99/543 |
| 2,526,712 | 10/1950 | Thompson | 146/33 |
| 2,742,067 | 4/1956 | Coons | 99/543 |
| 3,055,408 | 9/1962 | Harrer | 99/543 |
| 3,144,061 | 8/1964 | Greed | 99/545 |
| 3,144,121 | 8/1964 | Smith | 198/33 |
| 3,753,397 | 8/1973 | Shrewsbury | 99/538 |
| 3,797,639 | 3/1974 | Smith | 198/33 |
| 4,010,842 | 3/1977 | Smith | 198/394 |
| 4,046,067 | 9/1977 | Loveland | 99/543 |
| 4,487,307 | 12/1984 | Meissner et al. | 198/394 |
| 4,766,990 | 8/1988 | Colombo | 198/383 |
| 4,907,687 | 3/1990 | Meissner et al. | 198/394 |
| 5,027,699 | 7/1991 | Paterson et al. | 99/593 |

FOREIGN PATENT DOCUMENTS 2533807 9/1983 France .

Primary Examiner—David A. Scherbel
Assistant Examiner—Terrence R. Till

[57] ABSTRACT

A pear processing method and apparatus is provided which includes several mechanisms for properly orienting the pear prior to coring, peeling and seed celling of the pear. Each pear is tumbled between a pair of orienting rolls to a position wherein the stem of the pear is oriented downwardly. Whiskers on one of the rolls speed up this orienting of the pear. A friction clutch on the other roll helps maintain the pear in its proper position, once the proper alignment has been attained. The pear is dropped downwardly into a transfer cup having four resilient fingers which tend to orient the pear. The pear is then pushed out of the transfer cup downwardly into a feed cup having a concave receptacle for centering the stem of the pear and three upwardly extending arms which grasp and center the blossom end of the pear. The pear is then transferred to a station wherein the pear is cored and thereafter peeled and seed celled simultaneously. The stem and blossom are also trimmed. The pear is thereafter passed into a slice cup having a design which more effectively separates the waste from the processed pear.

2 Claims, 23 Drawing Sheets

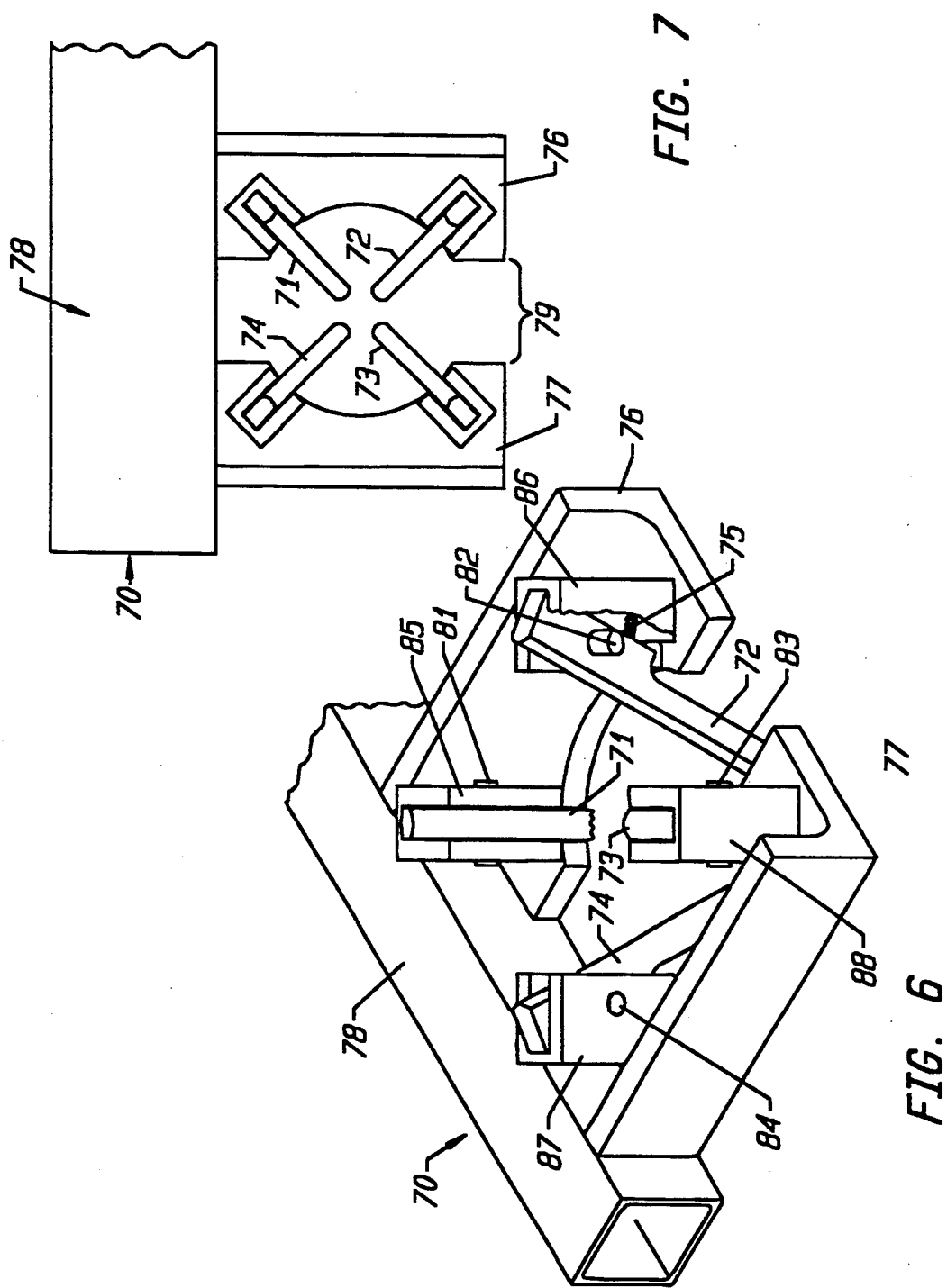

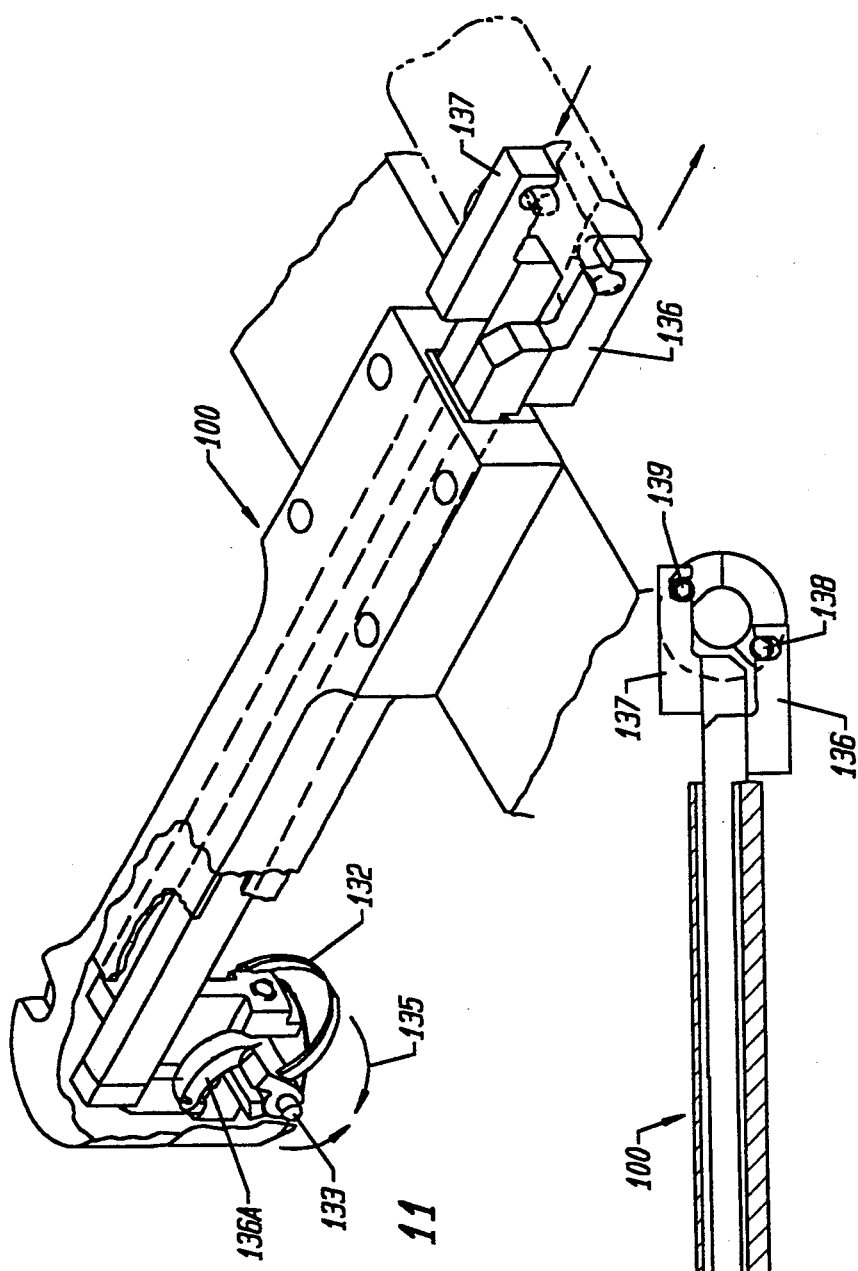
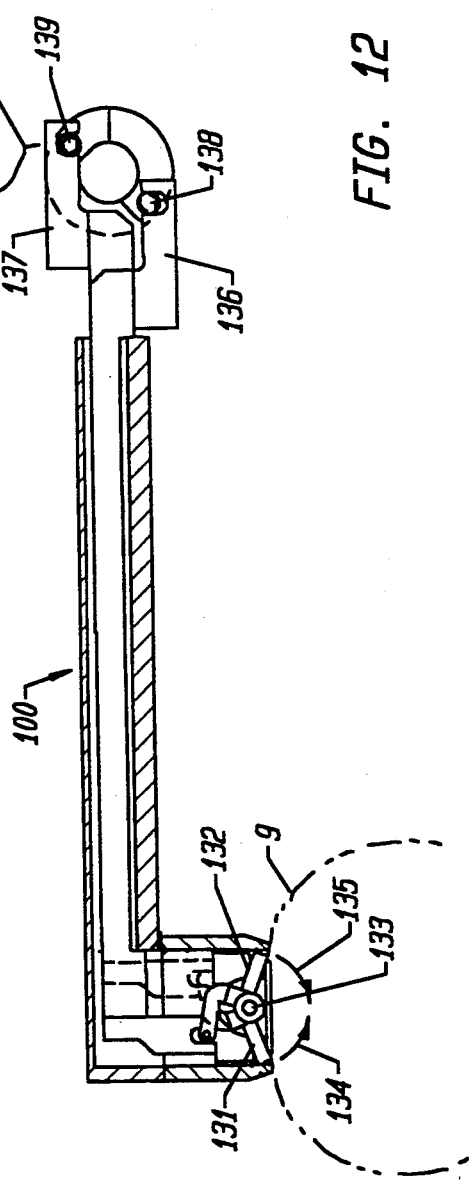
FIG. 11
FIG. 12

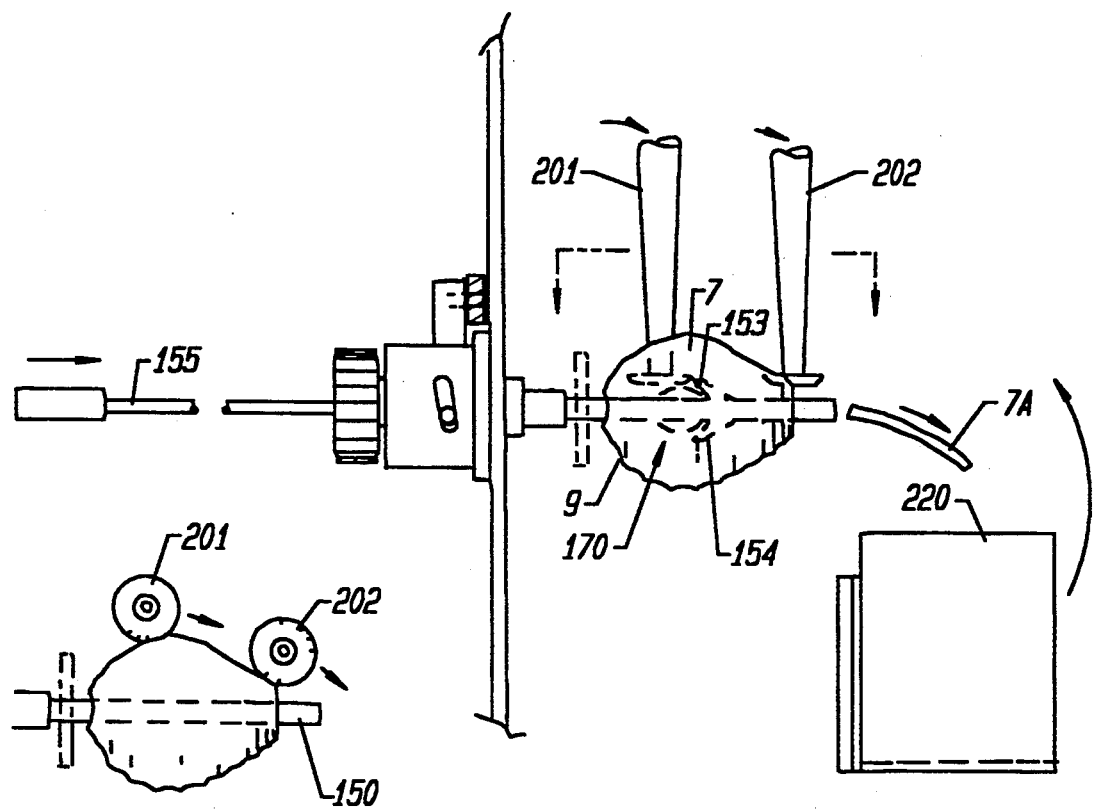
FIG. 15
FIG. 16
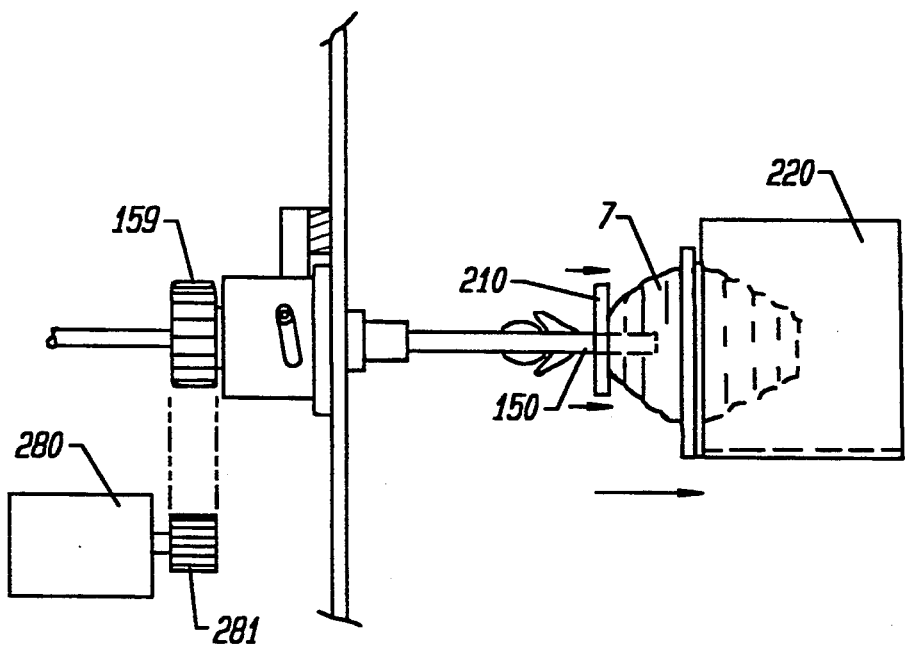
FIG. 17

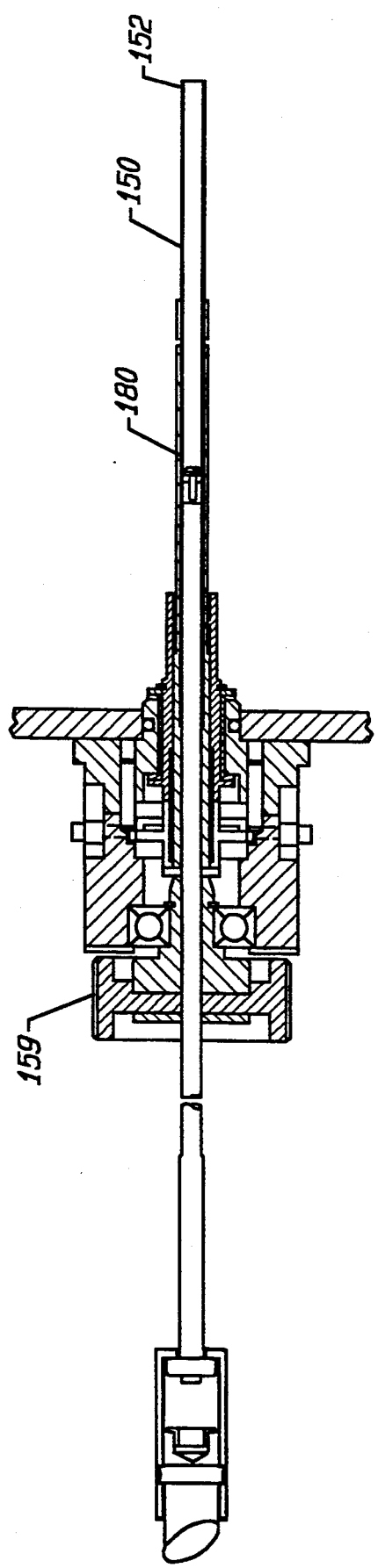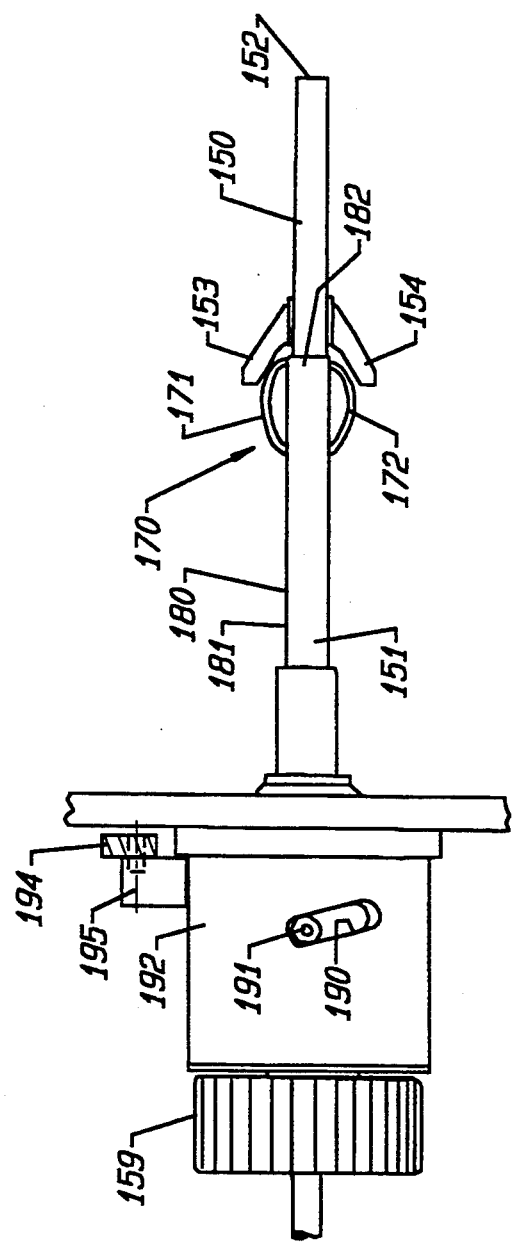
FIG. 19
FIG. 20

PEAR PROCESSING METHOD AND APPARATUS

This application is a division of application Ser. No. 08/035,667, filed Mar. 23, 1993.

BRIEF SUMMARY OF THE INVENTION

This invention relates generally to pear processing machines. More particularly, the invention relates to a method and apparatus for peeling, coring, seed celling and trimming pears of various sizes and shapes.

The apparatus includes a pear orienting mechanism which receives singulated pears from a feeder and tumbles the pears on orienting rolls until the stems are pointing downwardly. As each pear is properly oriented with its stem pointing downwardly, it is dropped into a transfer cup having a secondary mechanism for orienting misaligned pears. The transfer cup uses a plurality of resilient, spring loaded fingers wherein a misoriented pear tends to be oriented by one or more of those fingers.

Each pear is discharged from the transfer cup into a feed cup having a generally concave receptacle for receiving the stem of the pear and having a plurality of arms extending upwardly for grasping and centering the blossom or large end of the pear. The feed cup in effect offers a third orienting mechanism for properly aligning and positioning the pear.

A pusher and set height mechanism is utilized which positions the blossom end of each pear at a predetermined height to register the blossom end of the pear with the peeling and seed celling portion of the apparatus. The feed cup mechanism presents the pear to the coring, peeling and seed celling portion of the apparatus wherein peeling and seed celling occur simultaneously after the pear has been cored.

A primary object of the invention is to provide a method and apparatus for processing pears automatically which is faster, more efficient and utilizes less floor space than the methods and apparatus of the prior art.

Another primary object of the invention is to provide a method and apparatus for processing pears in which the orienting of the pears is improved by providing several steps during which the pears are repeatedly oriented.

A significant object of the invention is to provide a method and apparatus for processing pears which results in reduced instances of splitting of the pear during the seed celling operation.

Another significant object of the invention is to provide a method and apparatus for processing pears which achieves a better separation of waste from finished or usable fruit as compared to the prior art.

Another object of the invention is to provide a method and apparatus for processing pears utilizing fewer parts and resulting in an apparatus significantly easier to maintain.

Another object of the invention is to provide a pear processing apparatus for coring, peeling and seed celling pears wherein a set height mechanism is provided for positioning the blossom end of the pear at a predetermined height in the apparatus so that the pear can be properly located and aligned for the coring, peeling and seed celling operations.

Another object of the invention is to provide a pear processing apparatus capable of simultaneously peeling and seed celling pears automatically.

Another object of the invention is to provide a pear processing machine utilizing a roll orientor for orienting singulated pears into a position wherein the pear stem extends downwardly, and wherein whiskers are provided on the roll orientor to more quickly and more efficiently orient the pears.

A further object of the invention is to provide a roll orientor for pears incorporating a friction clutch mechanism wherein at least one of the orientor rolls stops rotating when the pear becomes properly oriented.

A further object of the invention is to provide a transfer cup for receiving the pears from the orientor, wherein the transfer cup provides an additional measure of orienting of misaligned pears.

A further object of the invention is to provide a feed cup mechanism for receiving the pears from the transfer cup wherein the feed cup mechanism provides a further mechanism for orienting misaligned pears. The feed cup mechanism incorporates a concave receptacle for locating and positioning the stem of a pear, and in addition a plurality of arms which move simultaneously to grasp and center the blossom end of the pear.

A further object of the invention is to provide a replaceable coring tube which may be readily removed and replaced.

A further object of the invention is to provide a pear processing apparatus including both blossom trim and stem trim mechanisms for efficiently and dependably trimming the blossom and stem ends of the pear.

Another object of the invention is to provide a pear processing apparatus which includes a slice cup mechanism for slicing the processed pears into a predetermined number of slices, for separating the usable product from the waste and for effectively transferring the usable sliced product to a discharge conveyor belt.

Another still further object of the invention is to provide a method for processing pears which includes multiple independent steps for properly orienting the pear as well as the step of simultaneously peeling and seed celling the pears.

Other objects and advantages of the invention will become apparent from the following description of the preferred embodiments and the drawings wherein:

FIG. 6 is a perspective view of the transfer cup according to the present invention;

FIG. 7 is a plan view of the transfer cup according to the present invention;

FIG. 11 is a perspective view of the pusher mechanism which also includes the blossom trim knives according to the present invention;

FIG. 12 is a sectional view of the apparatus shown in FIG. 11;

FIG. 15 is a schematic representation of the pear having been peeled, showing the mechanism for pushing out the pear core from the coring tube and showing the seed celler actuator assembly;

FIG. 16 is a bottom view showing schematically the path of the peeling knives over the surface of the pear;

FIG. 17 is a schematic representation showing the pear knockoff disc discharging the pear from the coring tube into the slice cup mechanism;

FIG. 19 is a sectional view of the internal portion of the coring and seed celling mechanism of the present invention;

FIG. 20 is a side elevational view of the seed celler knife assembly, the coring tube and the drive mechanism for the seed celler and the coring tube;

DETAILED DESCRIPTION OF THE DRAWINGS

Figure 1:
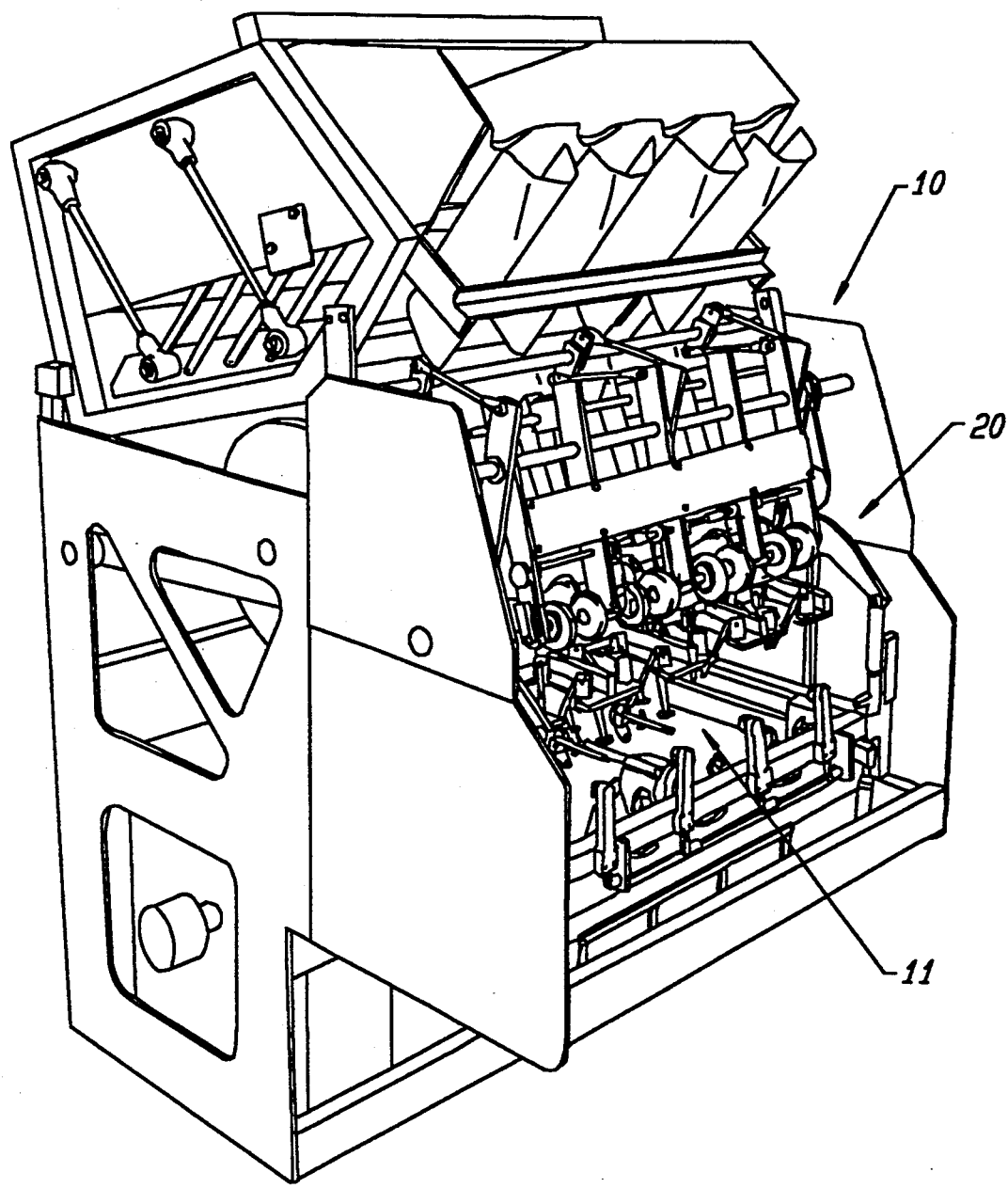
FIG. 1 is a perspective view of the pear processing apparatus according to the present invention.

Referring to FIG. 1, a pear processing apparatus 10 according to the present invention is shown. Pears are fed into the apparatus at the upper end of apparatus 10 at which a portion of the roll orientor 20 is shown. As will be described in greater detail hereafter, the pears are oriented with their stems extending downwardly and their blossom ends extending upwardly by the roll orientor 20, are dropped downwardly through portions of the mechanism, not visible in FIGS. 1 and 2. The coring, peeling and seed celling station is shown generally as 11 in FIG. 1.

FIGS. 2 through 5 show the roll orienting mechanism of the present invention.

Figure 2:
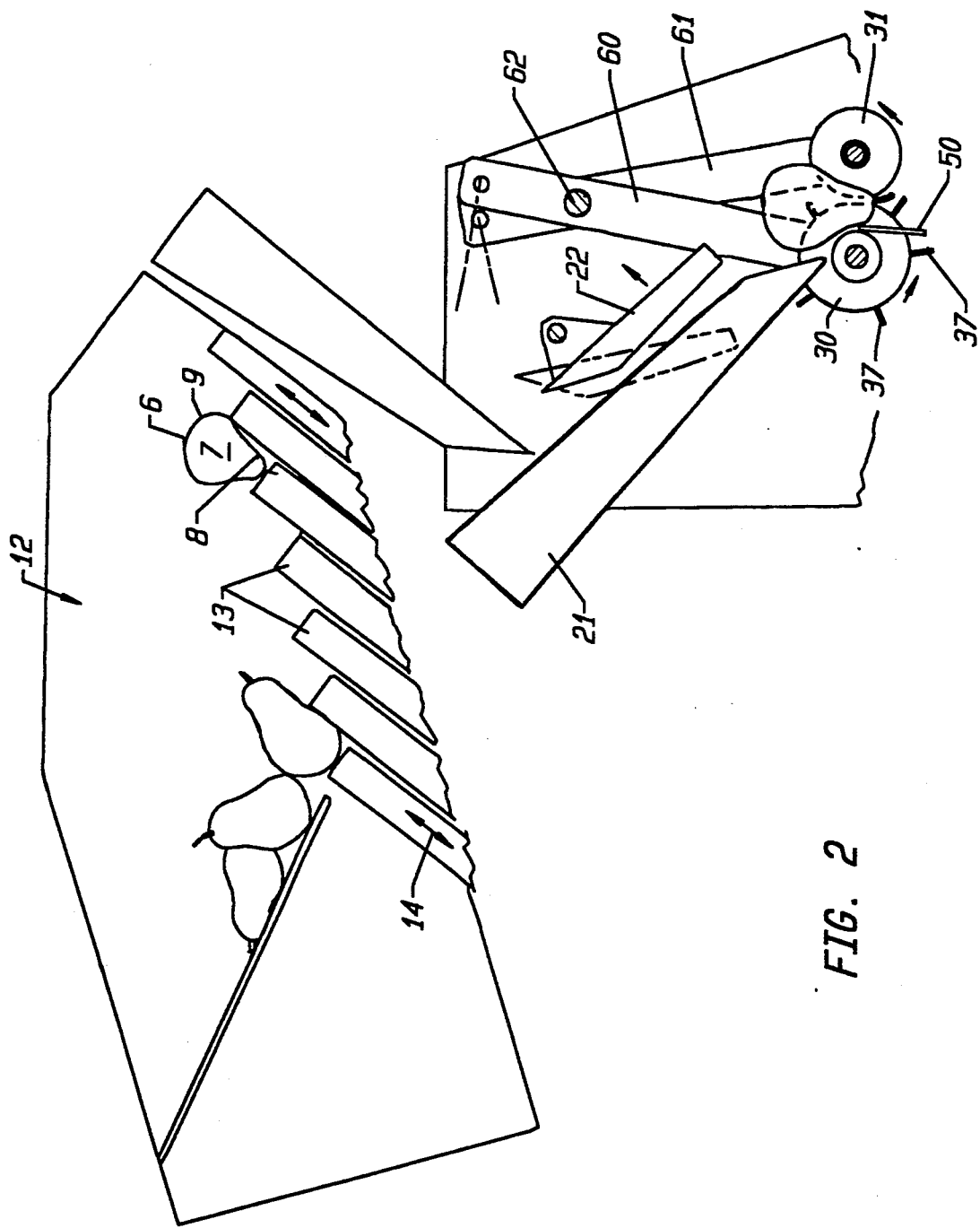
FIG. 2 is a schematic representation of the pear singulator and roll orientor.

A singulation device 12 is provided having a plurality of plates 13 which are alternately oscillated in the direction of arrows 14 to present pears one at a time to the upper end of chute 21. A typical pear 7 is shown in FIG. 2 with its stem end 8 extending downwardly and its blossom end 9 extending upwardly. The blossom end 9 is sometimes referred to herein as the butt end and carries the calyx 6.

Figure 3:
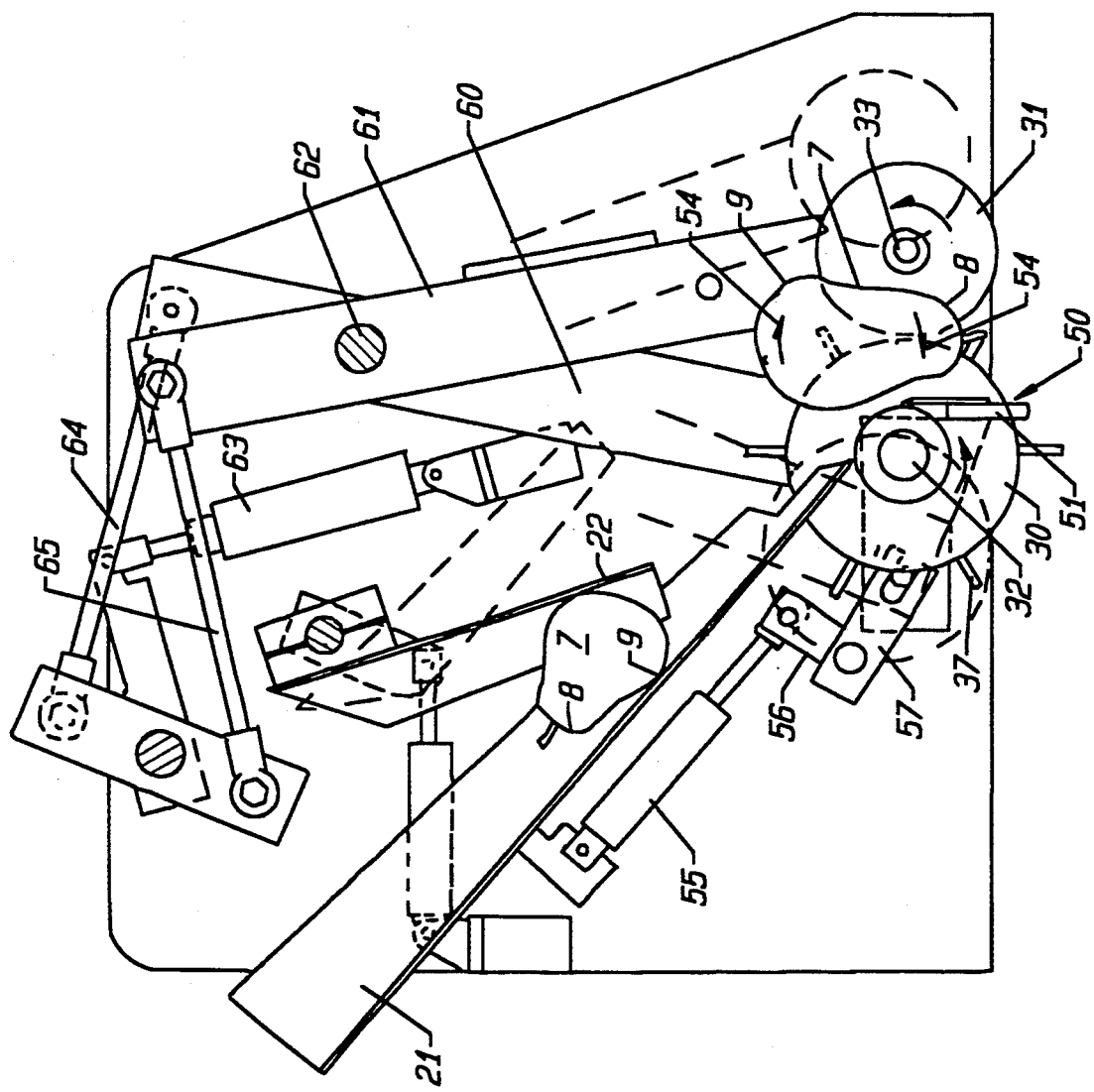
FIG. 3 is a side view of the roll orientor.
Figure 4:
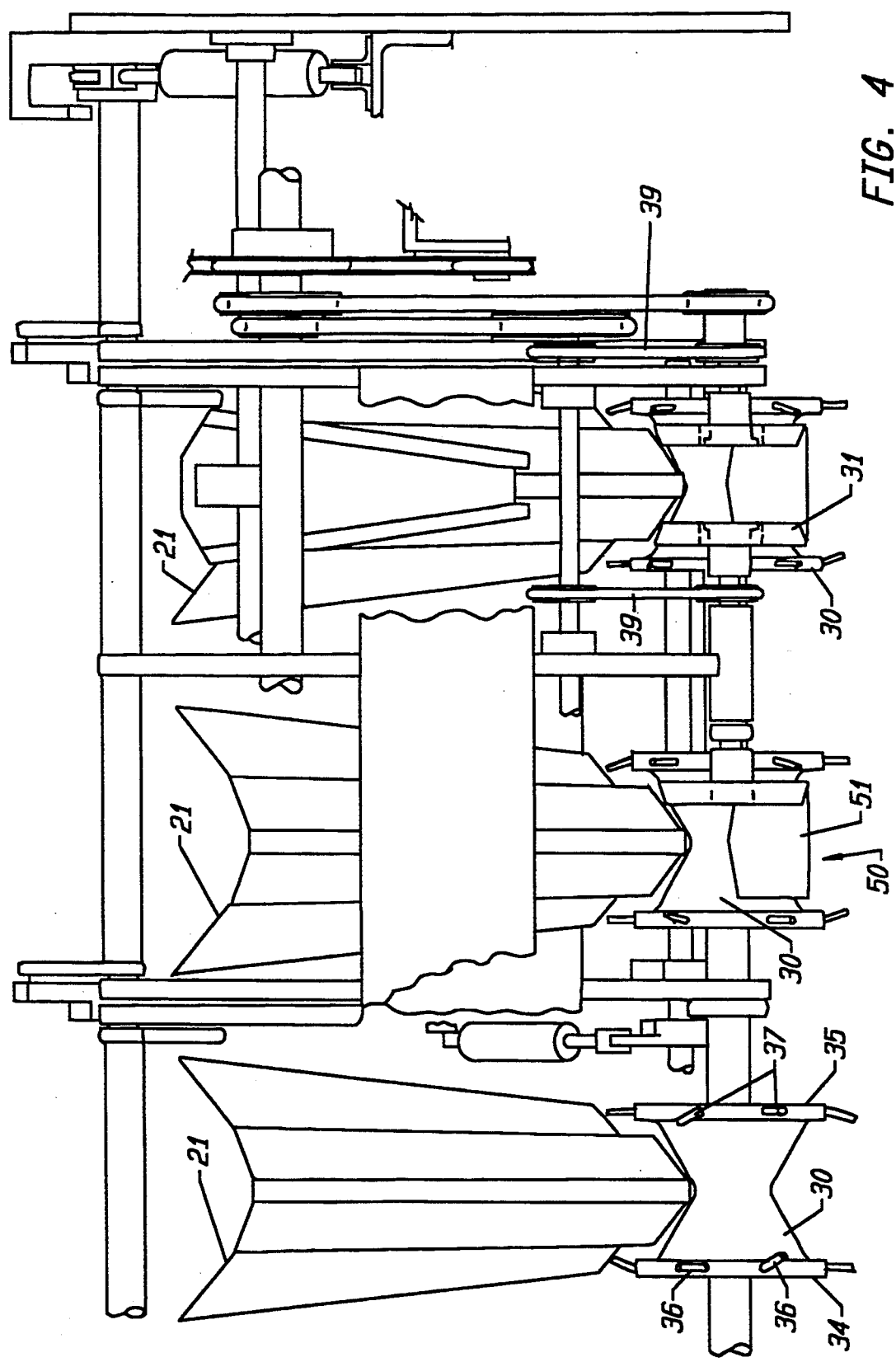
FIG. 4 is a front view of the roll orientor showing various portions of the orientor broken away.

As the pear enters chute 21, the taper of the chute, shown best in FIG. 4, causes the pears to tumble downwardly with the stem end 8 and blossom end 9 alternately contacting the floor of chute 21, as shown best in FIG. 3. The pear tumbles downwardly until it contacts gate 22. As gate 22 is opened to its position shown in phantom in FIG. 3, the pear 7 tumbles downwardly on chute 21 and onto orienting rolls 30 and 31. Back roll 30 and front roll 31 are mounted for rotation upon spaced horizontal axes 32 and 33, respectively. As shown best in FIG. 4, roll 30 has a left side 34 and right side 35. The rolls are driven by drive belts 39. The three chutes and roll orientors shown in FIG. 4 are shown at three different elevational viewing points with different components broken away.

Each back roll 30 carries a plurality of whiskers 36 on its left side 34 and a plurality of whiskers 37 on its right side 35. Each of the whiskers 36 and 37 extends in a direction radially outward from the axis of rotation 32 of the roll. The whiskers 36 and 37 urge the stems of misoriented pears extending beyond the left side 34 or the right side 35 of the roll toward the center of the roll. The whiskers help avoid the problem of prior art roll orientors taking excessive time to locate the stem of the pear and to tumble the pear to a position shown in FIG. 3 wherein the pear is positioned between rolls 30 and 31 with its stem end 8 extending downwardly. The whiskers 36 and 37 tend to shorten the time necessary for the rolls 30 and 31 to tumble the pear to the position shown in FIG. 3, wherein the stem of the pear extends downwardly.

Figure 31:
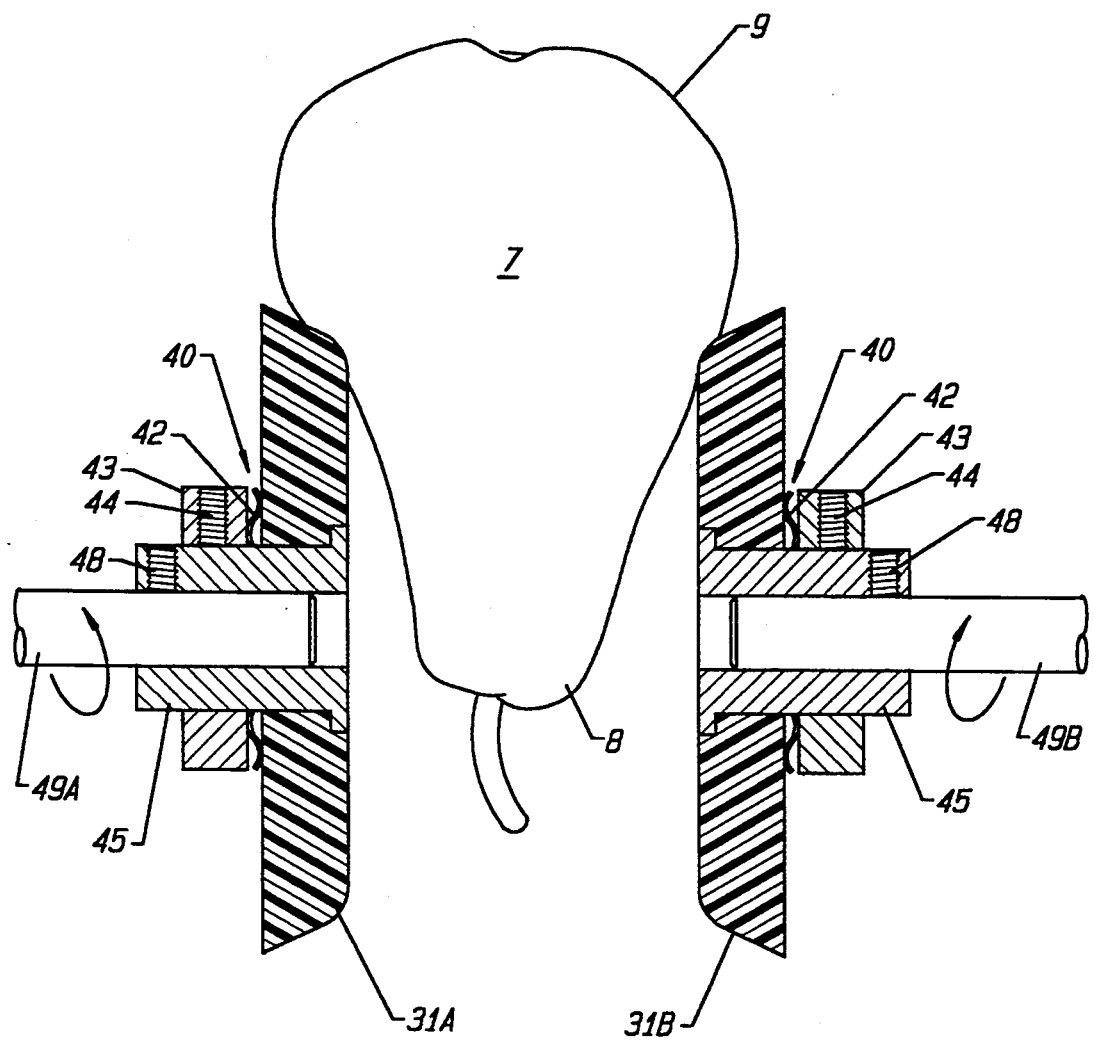
FIG. 31 is a sectional view of a front roll showing the friction clutch mechanism.

As shown best in FIG. 31, each front roll 31 is divided into symmetrical halves 31a and 31b, each carried by drive shafts 49a and 49b. A pear 7 tumbles in the space between halves 31a and 31b and roll 30. A friction clutch means 40 is provided for interrupting driving power to both halves 31a and 31b of front roll 31 when a pear is properly oriented between a pair of rolls 30 and 31. When a pear becomes oriented with its stem 8 downwardly between rolls 30 and 31 and with its blossom end or butt end 9 upwardly, the friction generated between the pear 7 and rolls 30 and 31 is maximized. When this position of pear 7 is achieved, friction clutch 40 (shown best in FIG. 31) allows both halves of roll 31 to stop rotating about axis 33. By stopping the rotation of roll 31, we have found that pear 7 tends to remain aligned between the pair of rolls 30 and 31 with its stem pointed downwardly. The friction clutch means 40 (FIG. 31) is preferably achieved by utilizing a wave spring 42 on each of roll halves 31a and 31b carried between each roll half and an adjustable collar 43 having a set screw 44. Roll 31 and collar 43 are carried by bushing 45 having a flange 46 at one end and set screw 48. Wave spring 42 rides against one side of each roll half. Collar 43 applies a predetermined amount of pressure against wave spring 42. When pear 7 is properly oriented, roll 31 stops rotating on its shaft 49.

Figure 5:
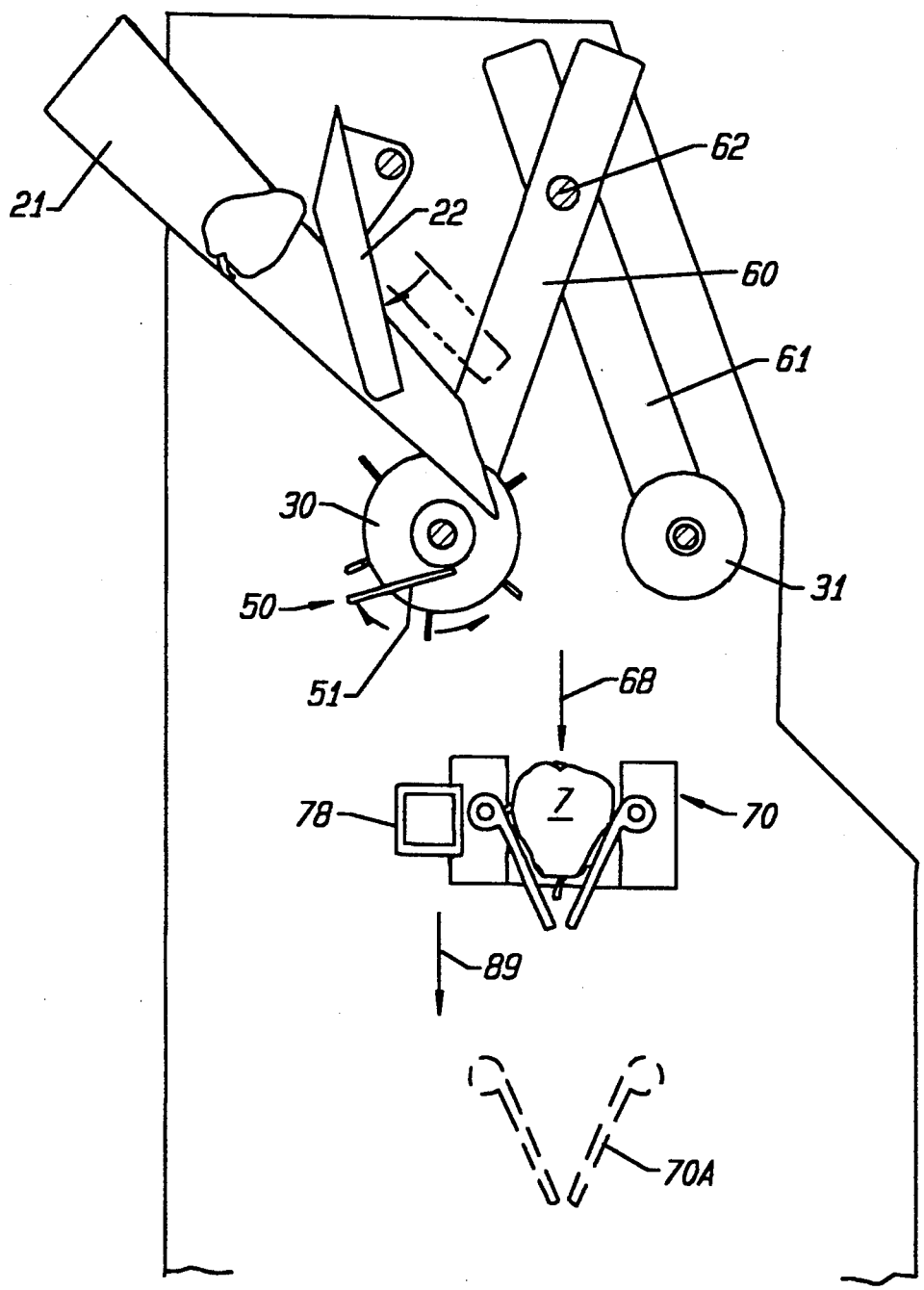
FIG. 5 is a schematic representation of the roll orientor after the roll orientor has dropped a pear downwardly into the transfer cup.

A pear stop means 50 is provided and is carried by back roll 30. Pear stop means 50 comprises a vertical or nearly vertical plate 51 which pivots about the axis 32 of roll 30. The lower end of plate 51 is offset slightly from the vertical to the right in FIG. 3 to sustain pear 7 as close to vertical as possible. The purpose of pear stop means 50 is to help retain the pear 7 as shown in FIG. 3 in its vertical position and to help prevent pear 7 from rotating in the direction of arrows 54. The stem 8 of pear 7 tends to rotate backwardly towards the axis of rotation 32 of back roll 30 as the rolls of 30 and 31 are separated to their positions shown in FIG. 5 (and as shown in phantom in FIG. 3). Cylinder 55 and linkage arms 56 and 57 hold pear stop means 50 in its nearly vertical or extended position as shown in FIG. 3. When rolls 30 and 31 are separated, as shown in FIG. 5, pear stop cylinder 55 is activated, moving pear stop means 50 to its retracted position shown in FIG. 5. Pear stop means 50 is moved to its retracted position out of contact with pear 7 abruptly as rolls 30 and 31 are separated in order to keep the pear 7 from rotating in the directions of arrows 54 shown in FIG. 3. The rolls 30 and 31 are disengaged and separated from the surface of pear 7 slightly prior to the time that pear stop means 50 is retracted so that pear 7 retains its proper alignment with the stem 8 extending downwardly and the blossom end extending upwardly.

Rolls 30 and 31 are carried by bars 60 and 61, respectively, which in turn are pivoted about shaft 62. A roll separation cylinder 63 is connected by linkage arms 64 and 65, respectively, to bars 60 and 61. When roll separation cylinder 63 is activated, linkage arms 64 and 65 operate to separate bars 60 and 61 and the axes of rotation 32 and 33 of rolls 30 and 31.

Rolls 30 and 31 are separated and, either slightly before or simultaneously with their separation, pear stop means 50 is retracted, so that the points of contact between the pear 7 and the orienting rolls 30 and 31 and with pear stop means 50 are separated from the surface of pear 7 abruptly and nearly simultaneously. This allows pear 7 to fall downwardly along the path of arrow 68 in FIG. 5 into transfer cup means 70.

Transfer cup means 70 is shown best in FIGS. 6 and 7. Transfer cup means 70 comprises four fingers 71, 72, 73, 74 and which form a generally "x" shaped array. Each finger extends downwardly towards the center of the "x" at a rest angle of between 30° and 60° to the horizontal. Each finger may be pushed downwardly against a spring loaded support until it forms an angle to the horizontal which approaches 90°. Each of the fingers is resiliently mounted as by a spring 75 shown in FIG. 6. Fingers 71 and 72 are carried by angle support 76 and fingers 73 and 74 are carried by angle support 77. Angle supports 76 and 77 are carried by frame member 78. Angle supports 76 and 77 extend in a parallel fashion away from frame member 78 forming an opening 79 between the ends of angle supports 76 and 77 distal from frame member 78. Opening 79 receives a pusher 100 described below.

As shown in FIG. 6, each of the fingers 71–74 is pivotally mounted by pins 81–84, respectively, to brackets 85 and 86 carried by angle support 76 and brackets 87 and 88 carried by angle support 77.

Since each of fingers 71–74 is resiliently mounted, a pear dropping downwardly into the center of the "x" formed by fingers 71–74 will experience equal pressure from each finger and will tend to remain centered in the "x." However, if the pear falls into the "x" off center, the resilient finger or fingers against which the pear has fallen tend to urge the pear toward the center of the "x" with a force proportional to how far off center the pear is. The four resiliently mounted fingers therefore cooperate to urge an off center pear towards the center of the "x" formed by the four fingers. Although it is possible to use a number of fingers different than the four shown, the preferred number of fingers is four as shown in FIGS. 6 and 7.

Figure 8:
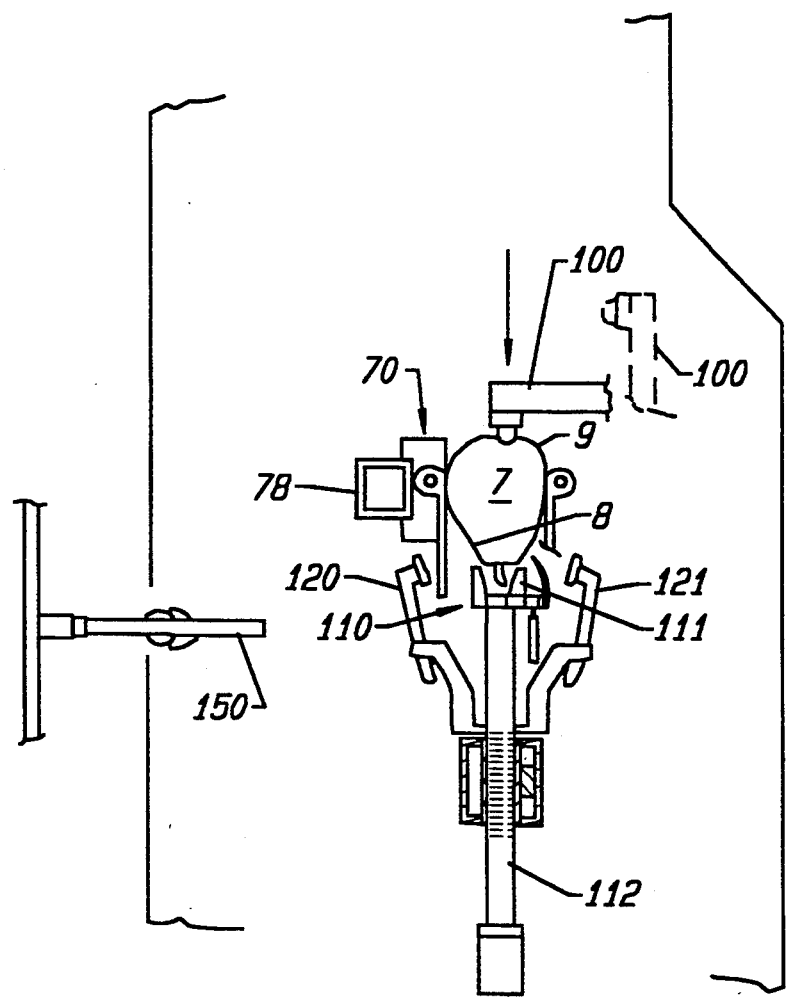
FIG. 8 is a schematic representation of the pear being pushed downwardly out of the transfer cup and into the feed cup and set height mechanism.

Transfer cup means 70 moves vertically between an upper or first position shown in FIG. 5 in which it receives a pear dropping from the orienting rolls 30 and 31 to a lower or second position shown in FIG. 8. Transfer cup means 70 moves downwardly along the path of arrow 89 in FIG. 5 to its lower or second position shown in phantom as 70a in FIG. 5 and as also shown in FIG. 8. Support frame 78 carries transfer cup means 70 between its upper and lower positions shown in FIG. 5 and FIG. 8, respectively.

Once the transfer cup means 70 has carried the pear to its lowermost position shown in FIG. 8, a pusher arm 100 is rotated from a vertical position shown in phantom in FIG. 8 to a horizontal position shown in FIG. 8, where it contacts the blossom end 9 of pear 7. After this contact is made, transfer cup means 70 begins traveling upwardly. As transfer cup means 70 moves upwardly, pusher 100 maintains contact with the blossom end 9 of pear 7. If pear 7 is somewhat misaligned, as transfer cup means 70 moves upwardly, the resiliently mounted fingers 71–74 tend to center the stem of the pear in the center of the "x" formed by those fingers. As this centering occurs, the blossom end 9 of pear 7 is free to slide against its contact point with pusher 100.

As the transfer cup means 70 moves upwardly, as shown in FIG. 8, pusher 100 also begins pushing pear 7 downwardly. After the blossom end of the pear moves the fingers 71–74 of the transfer cup to their nearly vertical position shown in FIG. 8, the stem end 8 of pear 7 is urged into feed cup means 110. Feed cup means 110 includes a generally concave shaped receptacle 111 having downwardly sloping walls which assist in centering the stem end 8 of the pear as it is urged into feed cup means 110 by pusher 100.

Figure 9:
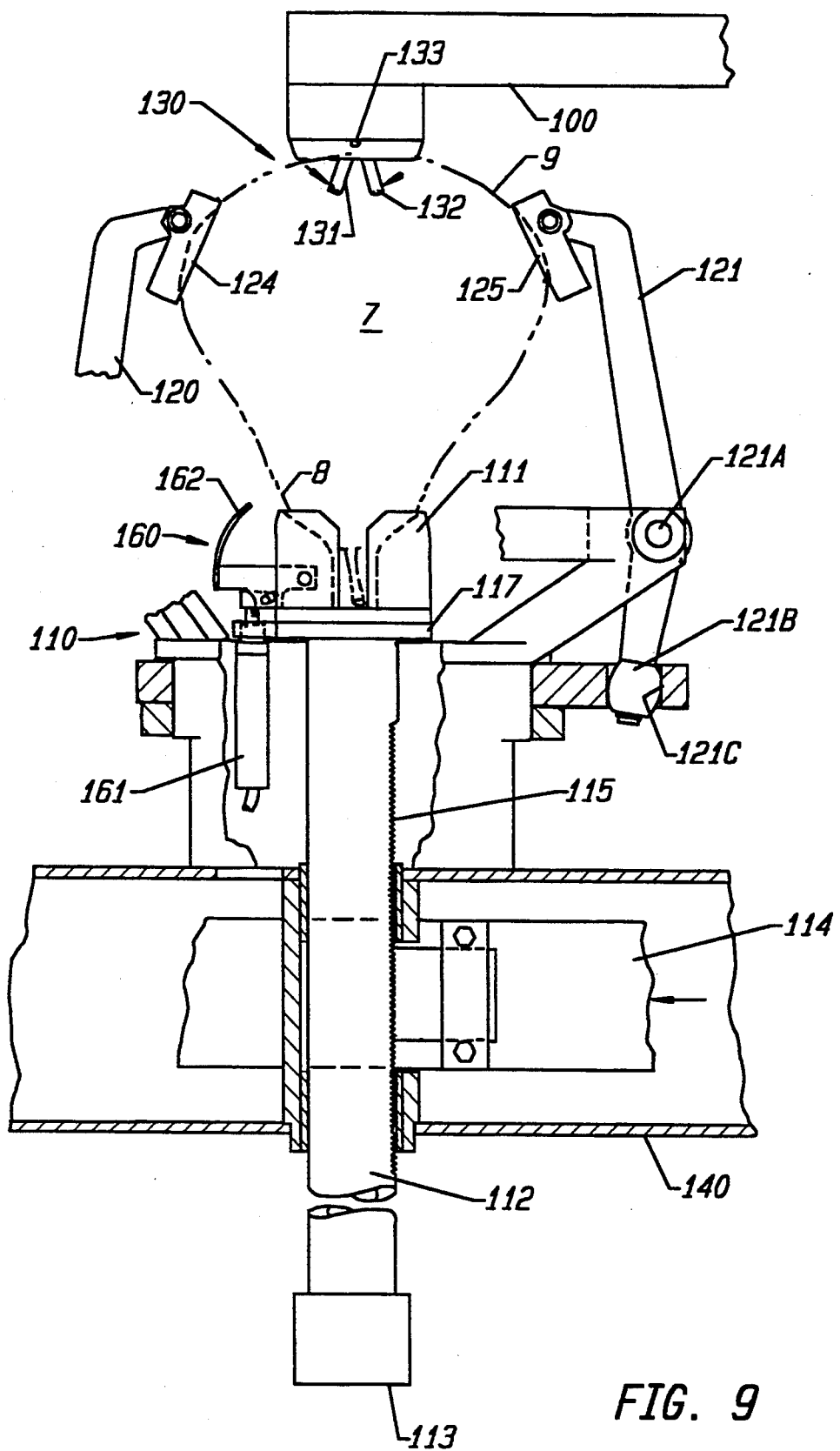
FIG. 9 is a sectional view of the feed cup mechanism and set height mechanism according to the present invention.

As shown best in FIG. 9, receptacle 111 is carried by a pressure loaded shaft 112 having a constant upwardly extending biased pressure which may be exerted by a spring acting between transfer bar 140 and the base plate 117 which supports receptacle 111. Base plate 117 is carried at the top of shaft 112. The lower end 113 of shaft 112 is a free end. The purpose of pressure loading shaft 112 is to account for the varying vertical dimensions of pears 7 between their stem and blossom ends. As pusher 100 urges pear 7 downwardly, the stem end 8 of pear 7 contacts the receptacle 111 of feed cup means 110. Pusher 110 continues to urge pear 7 downwardly against pressure loaded shaft 112 until pusher 110 reaches a predetermined "set height" for the blossom end 9 of pear 7. This particular "set height" is used to register the blossom end of the pear into proper alignment with the peeling and seed celling means as discussed below.

When pusher 100 has urged the blossom end 9 of pear 7 to the predetermined "set height," the pressure loaded shaft 112 supporting the feed cup receptacle 111 is locked into position by movable bar 114 with a serrated edge moving to the left in FIG. 9 to engage the serrations 115 formed on the surface of shaft 112.

Figure 10:
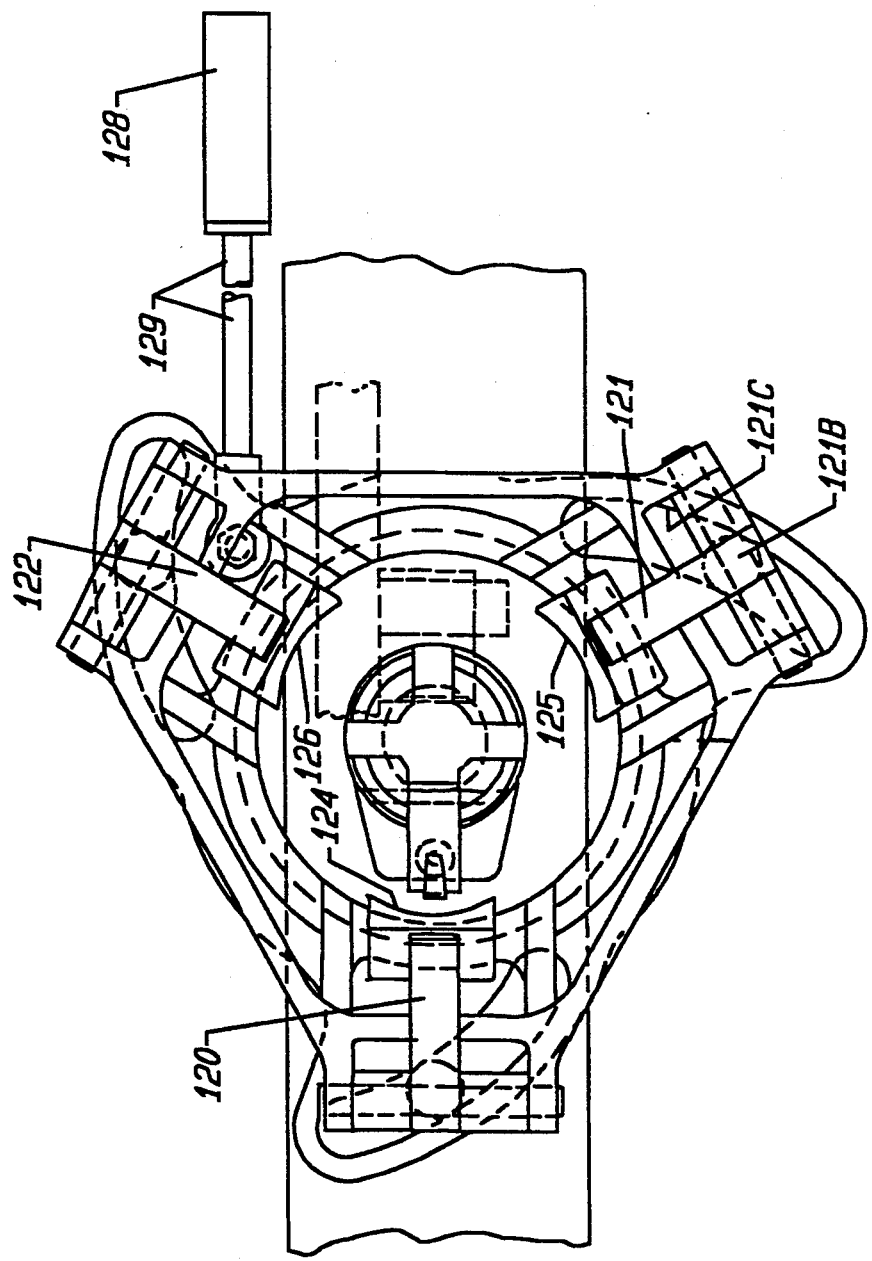
FIG. 10 is a top view of the feed cup mechanism of FIG. 9.

Shortly before the movable bar 114 locks shaft 112 into position, a plurality of arms 120, 121 and 122 extending upwardly relative to said feed cup receptacle engage and center the blossom end 9 of pear 7. Arms 120, 121 and 122 are all identical, each pivoting about a horizontal axis 121a. The lower end 121b of arm 121 is driven inwardly and outwardly by a cam surface 121c. The upper end of each arm carries a plastic pad 124, 125 and 126, each of which is pivotally connected to each of the arms and each contacts the blossom end 9 of the pear 7. As shown best in FIG. 10, the lower end 121b of arm 121 is a cam follower, which follows the cam surface 121c. Each of the arms 120, 121 and 122 will move simultaneously and will therefore tend to center the blossom end 9 of the pear 7 as the pads 124, 125 and 126 contact the pear.

A variable force drive means for driving arms 120, 121 and 122 includes an adjustable pressure air cylinder 128 which drives connecting rod 129. This feature allows a predetermined amount of force to be applied to the pear by arms 120, 121 and 122 to account for pears of different degrees of softness.

After the pear has been grasped by the three arms 120, 121 and 122 and held against the feed cup receptacle 111, the blossom end of the pear is trimmed by blossom trim means 130 comprising blossom trim blades 131 and 132 which rotate about pivot 133. As shown best in FIGS. 11 and 12, blossom trim blades 131 and 132 are driven in the path of arrows 134 and 135, respectively, by drive levers 136 and 137, respectively. As drive lever 136 is driven to the right in FIG. 12 by pin 138, blade 132 is driven downwardly in the direction of arrow 135. Simultaneously, lever 137 is driven to the left in FIG. 12 by pin 139 which rotates blossom trim blade 131 in the direction of arrow 134 to achieve a generally hemispherical cut trimming the calyx from the blossom end 9 of the pear 7. Lever 136 is connected to blade 132 by link 136a. A similar link joins lever 137 to blade 131.

Figure 13:
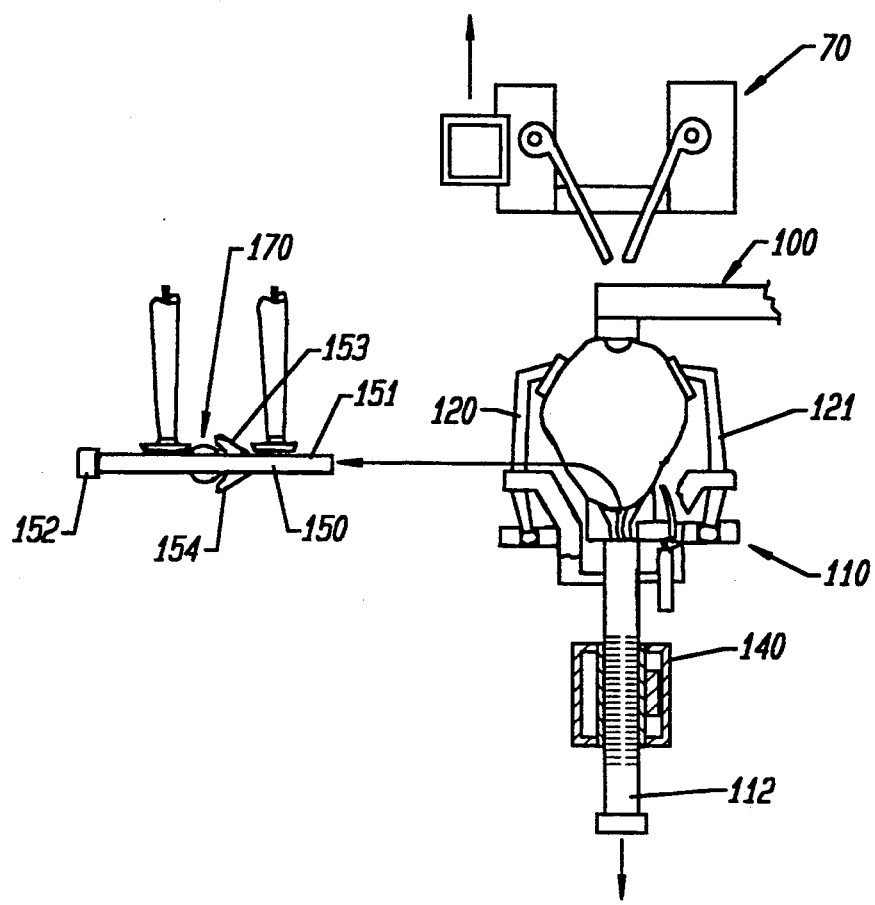
FIG. 13 is a schematic representation of the feed cup and set height mechanisms after the pear height has been set, the pear has been grasped by the feed cup assembly and wherein the pear is about to be presented to the coring, peeling and seed celling mechanism.

As shown in FIG. 13, the feed cup assembly including the feed cup means 110, the three arms 120, 121 and 122, the pressure loaded shaft 112 and the serrated locking piece 114 are separated from the pusher means and is carried by transfer bar 140 through a 90° turn and drives the pear onto the coring tube 150. Coring tube 150 is a hollow cylindrical tube having a distal end 151 and a proximal end 152. Coring tube 150 carries near its distal end 151 a pair of turning fins 153 and 154.

Figure 14:
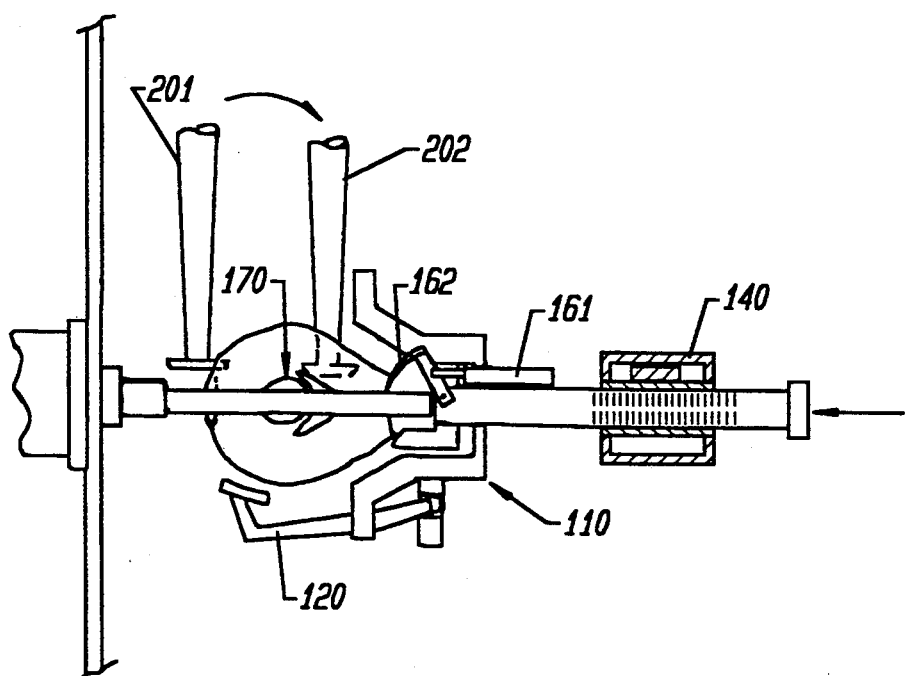
FIG. 14 is a schematic representation of the pear and feed cup assembly having made a 90° turn and having pushed the pear onto the coring tube and having properly positioned the pear for peeling and seed celling.

As shown in FIG. 14, the pear 7 has been impaled upon coring tube 150. Arms 120, 121 and 122 have been opened after the pear has been impaled on the coring tube. After arms 120–122 have opened, feed cup means 110 backs up slightly, and turning fins 153 and 154 begin to rotate, causing the pear 7 to rotate with the coring tube 150.

As the pear is rotated by the coring tube 150 and turning fins 153 and 154, a stem trim knife 160 carried by feed cup means 110 is activated by stem trim cylinder 161, advancing stem trim knife blade 162 downwardly into position to sever the pear stem as the pear is rotated. During the first complete revolution of the pear 7, the stem is trimmed and thereafter the feed cup assembly 110 is retracted and peeling begins by motion of peeling knives 201 and 202, each peeling approximately one-half of the pear. Rotary cutter 201 starts at the blossom end 9 of pear 7 and, as the pear is rotated on coring tube 150, rotary cutter 201 begins rotating and moves from blossom end 9 to approximately the center of the pear 7. Simultaneously, rotary peeling knife 202 begins approximately at the center of pear 7 and moves to the right in FIG. 15 to the stem 8 of the pear 7. The peeling knives are described in greater detail in U.S. Pat. No. 5,027,699 dated Jul. 2, 1991 and entitled "Peeling Head."

As the pear 7 is being rotated by turning fins 153 and 154, a seed celler knife means 170 rotates with them. However, during the last full revolution of the pear 7 caused by turning fins 153 and 154, the seed celling knife means 170 is held stationary as will be described below and, during this final revolution of the pear 7, the seed cell of the pear is severed by the seed celler knife means 170.

During peeling the core 7a is pushed out of coring tube 150 by core push-out rod 155.

As shown in FIG. 17, when the peeling operation has been concluded, the pear is pushed off the coring tube 150 by a knockoff disc 210 which drives the pear into slice cup 220, shown in greater detail in FIGS. 25 and 26 below.

Figure 18:
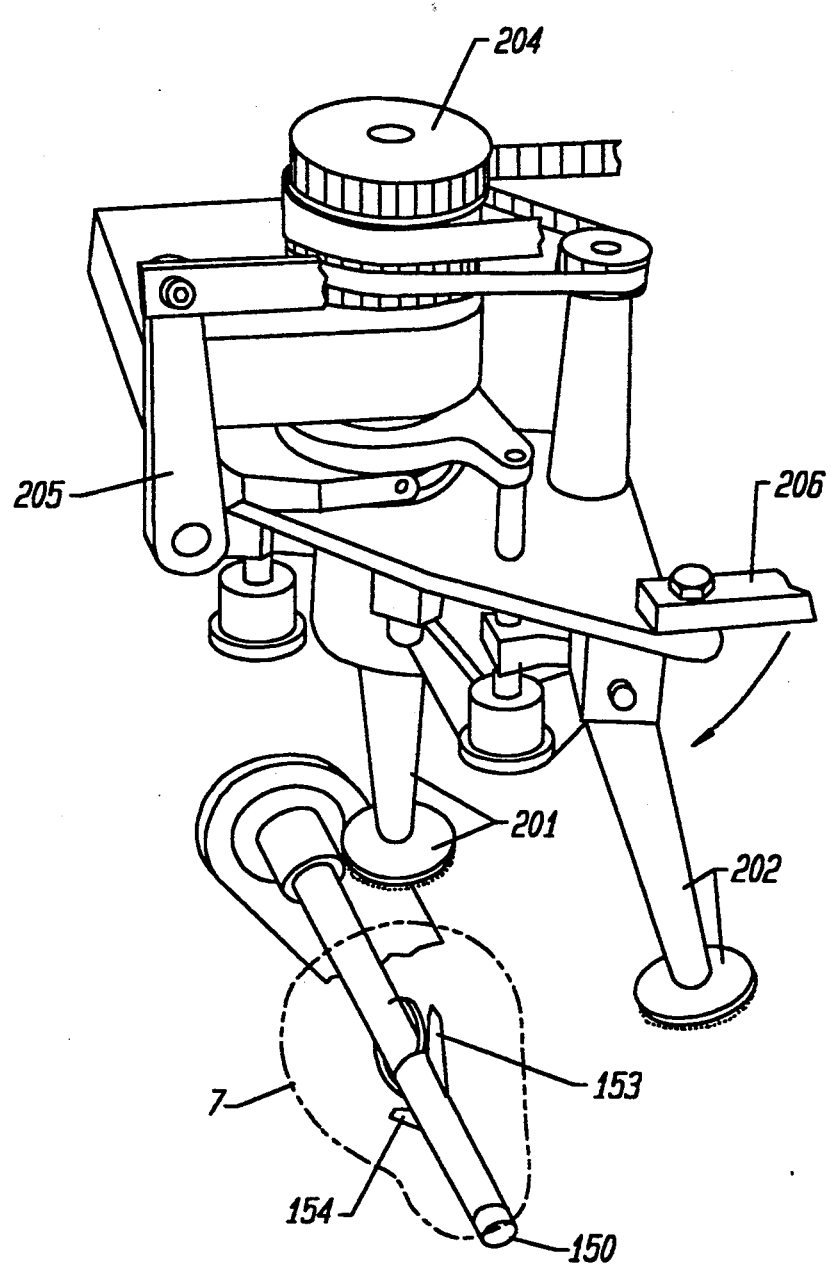
FIG. 18 is a perspective view of the peeling cutter mechanism.

FIG. 18 shows the rotary peeling cutters which are described in full in U.S. Pat. No. 5,027,699. Peeling cutters 201 and 202 are driven by a drive wheel 204 and are moved on and off the pear by kick out lever 205 and are moved forward in the peeling cycle by lever 206.

Referring to FIG. 20, seed celler knife means 170 comprises two blades 171 and 172 carried by hollow, cylindrical seed celler support tube 180, having a proximal end 181 and a distal end 182. Seed celler blades 171 and 172 are carried by seed celler support tube 180 near its distal end 182.

Coring tube 150, which is a hollow and cylindrical tube, has a proximal end 151 and a distal end 152. Coring tube 150 extends through seed celler support tube 180, the distal end 152 of coring tube extending beyond the distal end 182 of the seed celler support tube 180 and at least one turning fin 153 or 154 is carried by the distal end 152 of coring tube 150. In the preferred embodiment, two turning fins are utilized mounted 180 degrees apart.

Seed celler blades 171 and 172 are aligned with turning fins 153 and 154 so that, as turning fins 153 and 154 rotate to cause pear 7 to rotate, seed celling blades 171 and 172 rotate with turning fins 153 and 154.

Figure 21:
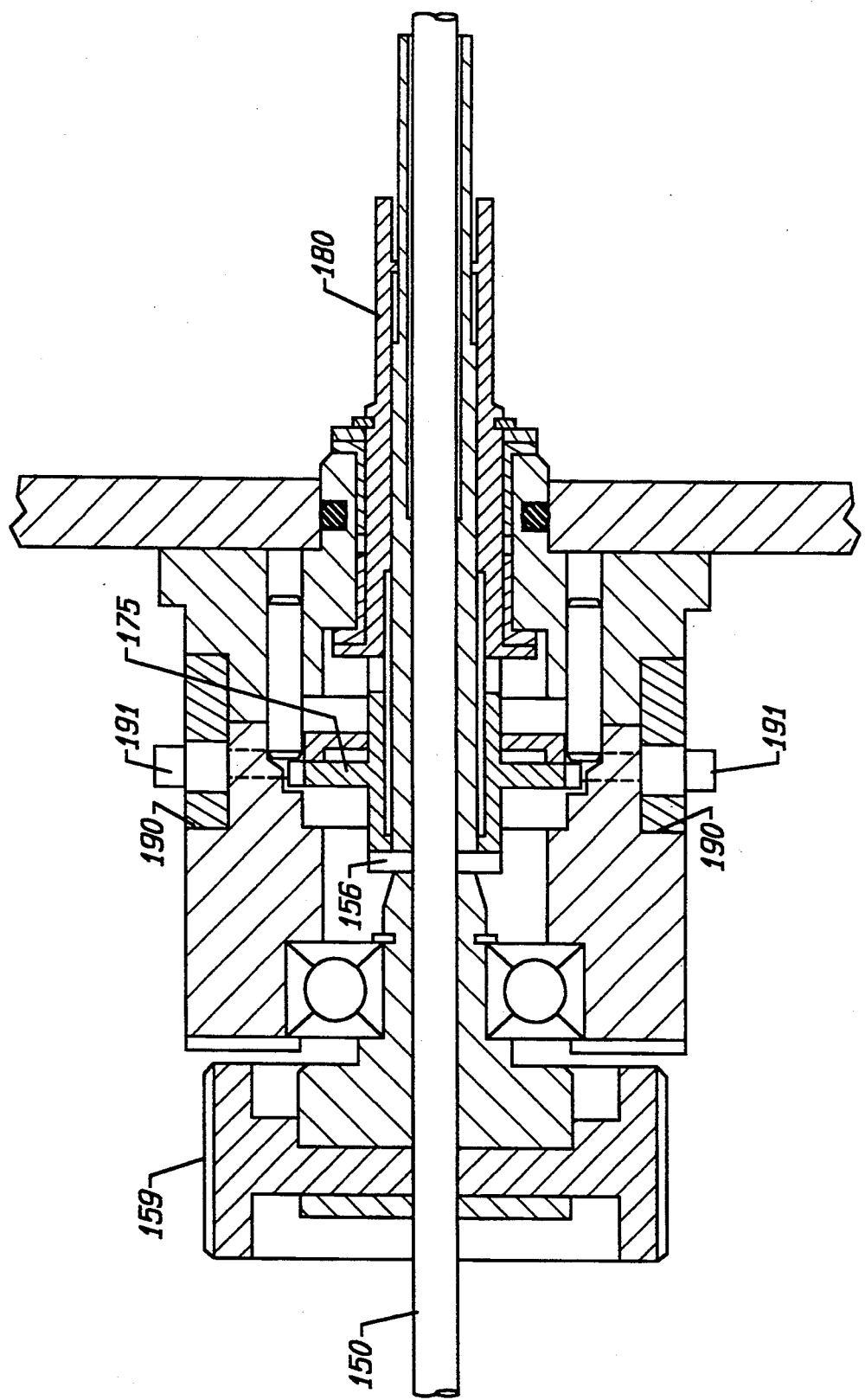
FIG. 21 is a sectional view of a portion of the drive mechanism for the seed celler knives and the coring tube, wherein the seed celling knives rotate with the turning fins carried by the coring tube.
Figure 22:
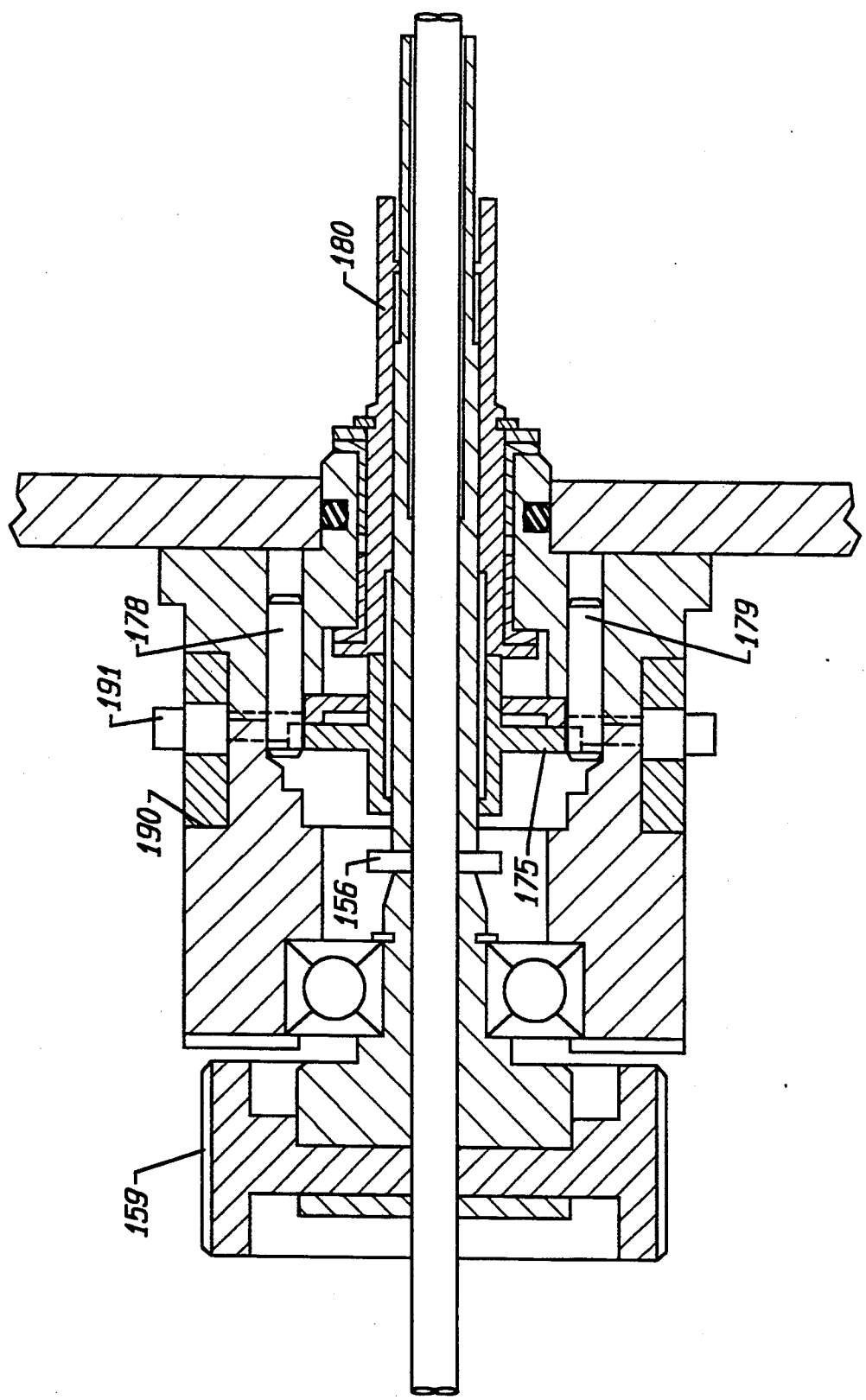
FIG. 22 is a sectional view of the drive mechanism shown in FIG. 21 wherein the seed celling knives are held stationary while the turning fins and coring tube continue to rotate.
Figure 23:
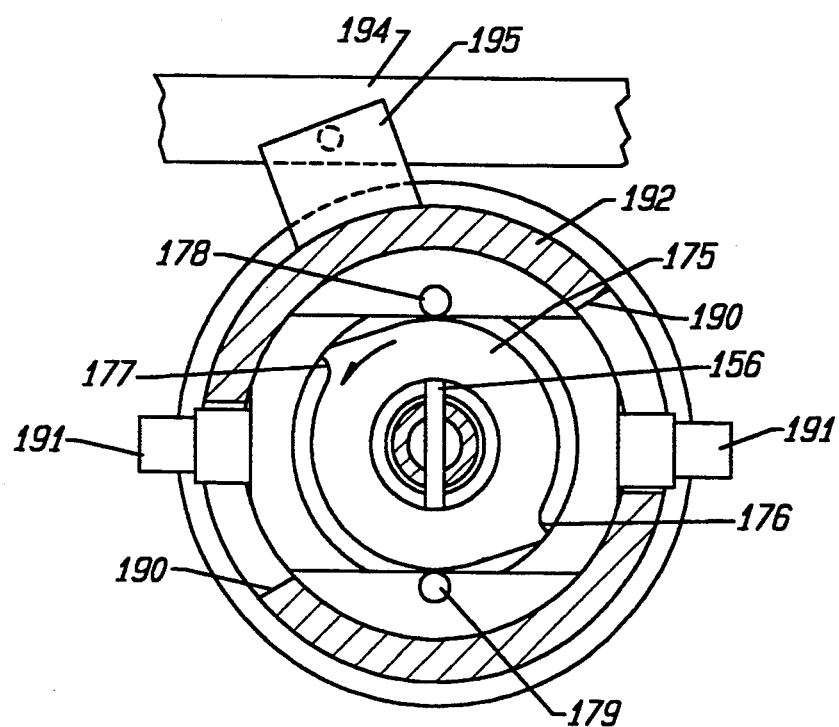
FIG. 23 is a sectional view of a portion of the coring tube and seed celler support tube drive means wherein the coring tube is rotating with the seed celler support tube.
Figure 24:
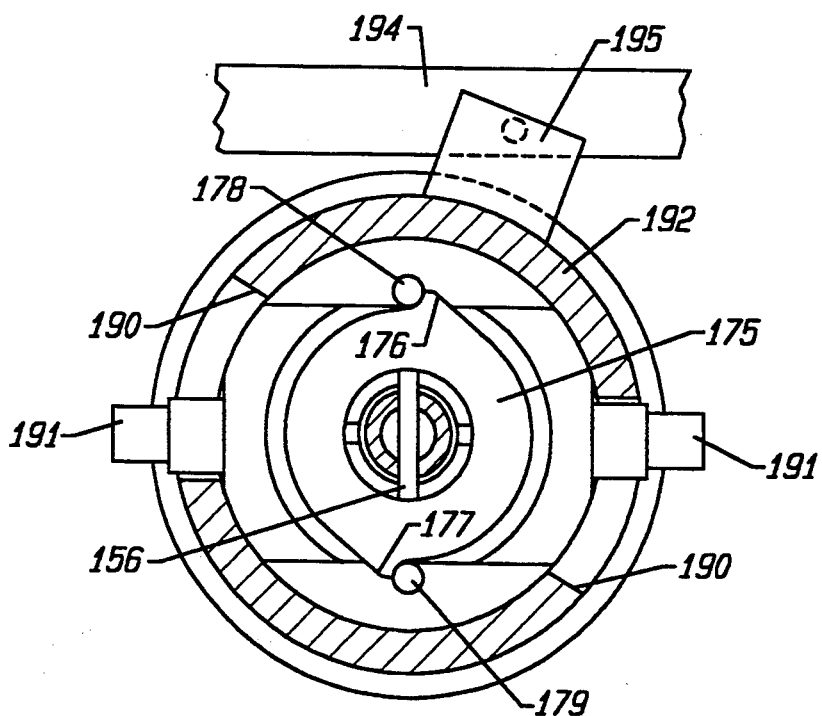
FIG. 24 is a sectional view of a portion of the drive means for the coring tube and seed celler support tube wherein the seed celler knives are held stationary but wherein the coring tube continues to rotate.

FIGS. 21 and 22 show in greater detail the drive mechanism for the coring tube 150 and seed celler support tube 180. The coring tube drive pulley 159 receives power from a pulley 281 driven by stepping motor 280 (FIG. 17) and transmits the power directly to coring tube 150 and indirectly to seed celler support tube 180 through a disengageable drive pin 156. As shown in FIG. 22 power from the coring tube drive pulley 155 to the seed celling support tube 180 is disengaged by separating drive pin 156 from a movable plate 175. As shown in FIG. 23, drive pin 156 is fully engaged with plate 175. In this mode, power is being transmitted from pin 156 through plate 175 directly to the seed celler support tube 180. However, as shown in FIG. 24, which corresponds to FIG. 22, when plate 175 is moved to the right in FIG. 22 and disengages from drive pin 156, the two tangs 176 and 177 of plate 175 engage stops 178 and 179, respectively. In this condition, the seed celling knives 171 and 172 are held stationary but coring tube 150 and turning fins 153 and 154 continue to rotate. Therefore in the condition shown in FIGS. 22 and 24, the seed cell of the pear is being severed by the rotation of the pear against the stationary seed cell knives. As used in the claims, the phrase "brake means" includes plate 175, tangs 176 and 177, as well as stops 178 and 179.

The power to the seed celling support tube is engaged and disengaged by cam surface 190 and cam follower 191 (FIG. 20). The cam surface 190 is formed in ring 192. Ring 192 is moved from the engaged to disengaged positions by bar 194 and block 195 which together cause the ring 192 to rotate between the engaged position shown in FIG. 23 and the disengaged position in FIG. 24. In the disengaged position shown in FIG. 24, the power is disengaged to the seed cell support tube, and simultaneously the brake means are engaged to hold the seed celling knives 171 and 172 stationary.

Figure 25:
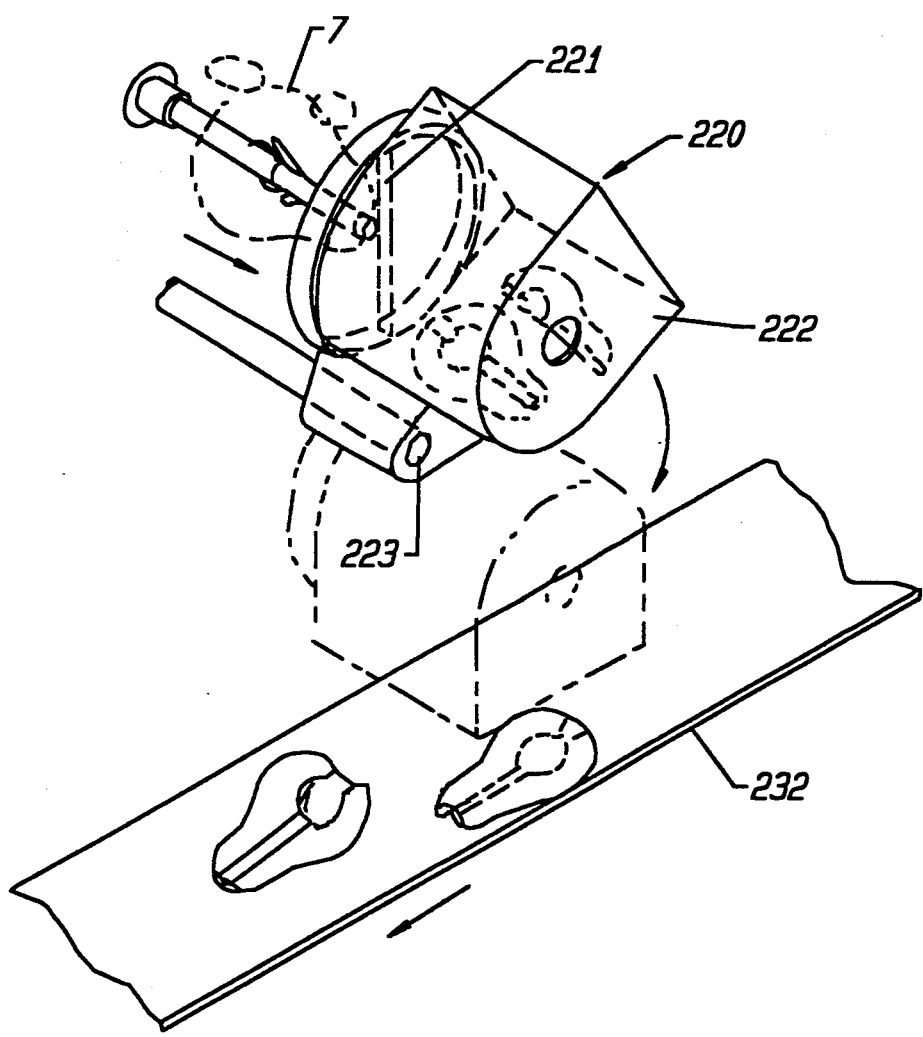
FIG. 25 is a perspective view of the pear knockoff disc discharging a processed pear from the coring tube into the slice cup mechanism and which shows in phantom the discharge position of the slice cup.
Figure 26:
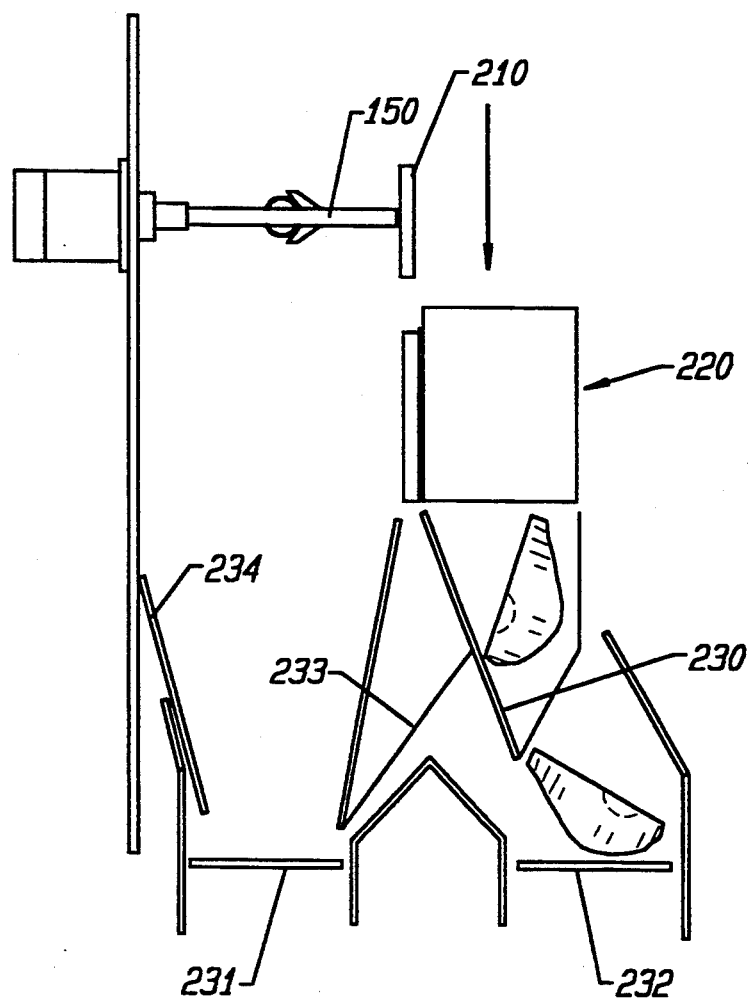
FIG. 26 is a schematic representation showing the slice cup discharging the usable sliced pears onto a discharge conveyor.

FIG. 25 shows a slice cup means 220 rotatable between a first or upper position and a second or lower position shown in phantom in FIG. 25. In the first or upper position, a blade 221 is positioned to sever the pear 7 into halves as the knock off disc 210 pushes the pear through blade 221. Various blades may be used. Slice cup means 220 comprises a generally U shaped container 222 which, in its first or upper position, contains the severed pear halves as shown in FIG. 25. After the pear halves have been deposited in slice cup 222, the slice cup is rotated downwardly about shaft 223 in a rather abrupt fashion to fling the pear halves downwardly against an inclined processed pear discharge chute 230 onto processed pear conveyor 232, shown best in FIG. 26. By flinging the slice cup downwardly toward chute 230, the usable pear portions are more effectively separated from the waste seed cell. When slice cup 222 is in its downward position, in which it forms a generally inverted U-shape, cup 222 effectively surrounds the upper portion of discharge chute 230. Any waste product that drops onto cup 222 tends to slide off cup 222 and into the waste discharge chute formed by walls 233 and 234. As shown in FIG. 26, waste conveyor 231 receives waste from waste discharge cute having inclined walls 233 and 234 and removes the stem trim waste, the peel strings and the core, whereas conveyor 232 removes the usable pear product and as little as possible of the waste.

Figure 27:
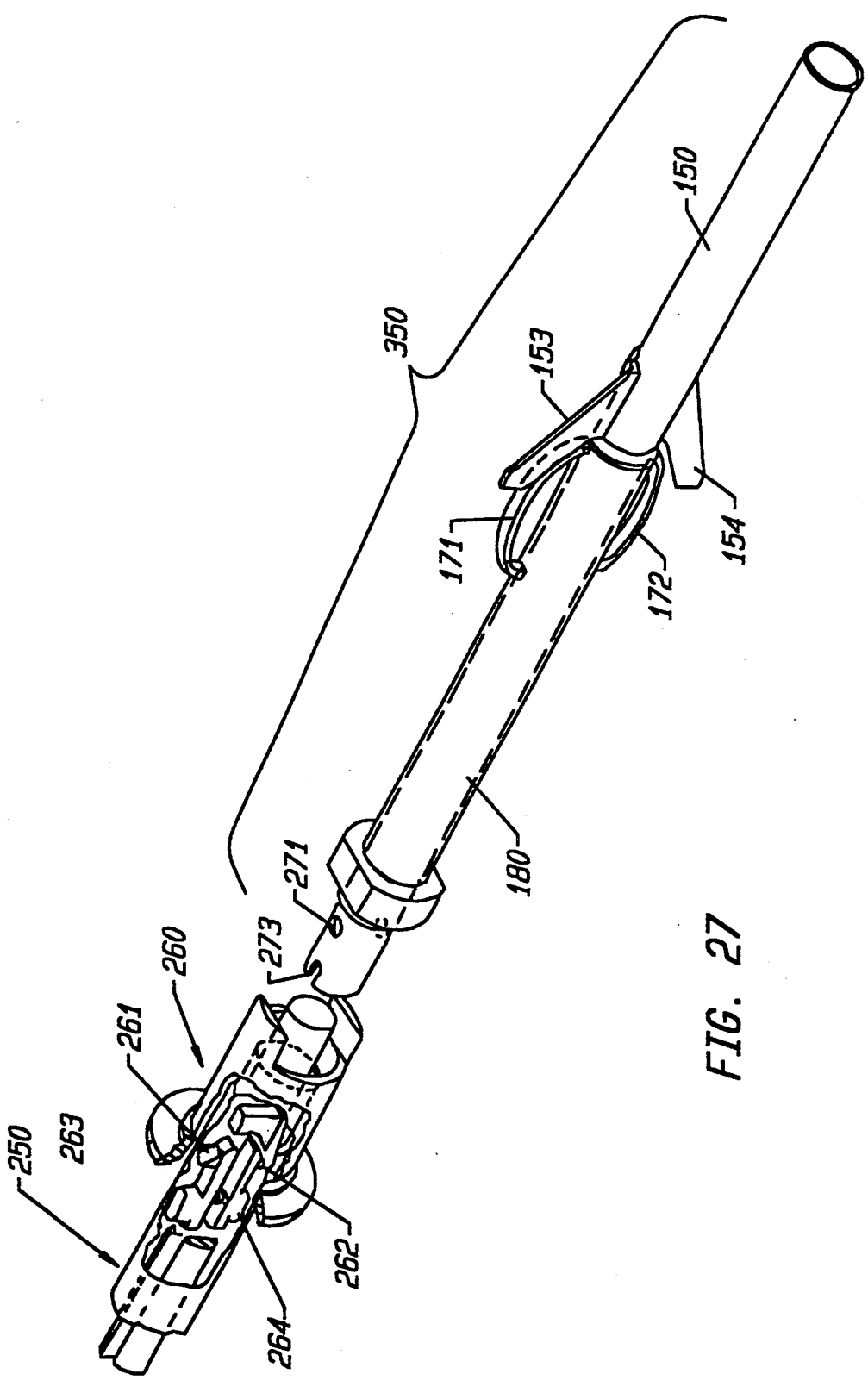
FIG. 27 is a perspective view, partially exploded, showing the replaceable coring tube according to the present invention.
Figure 28:
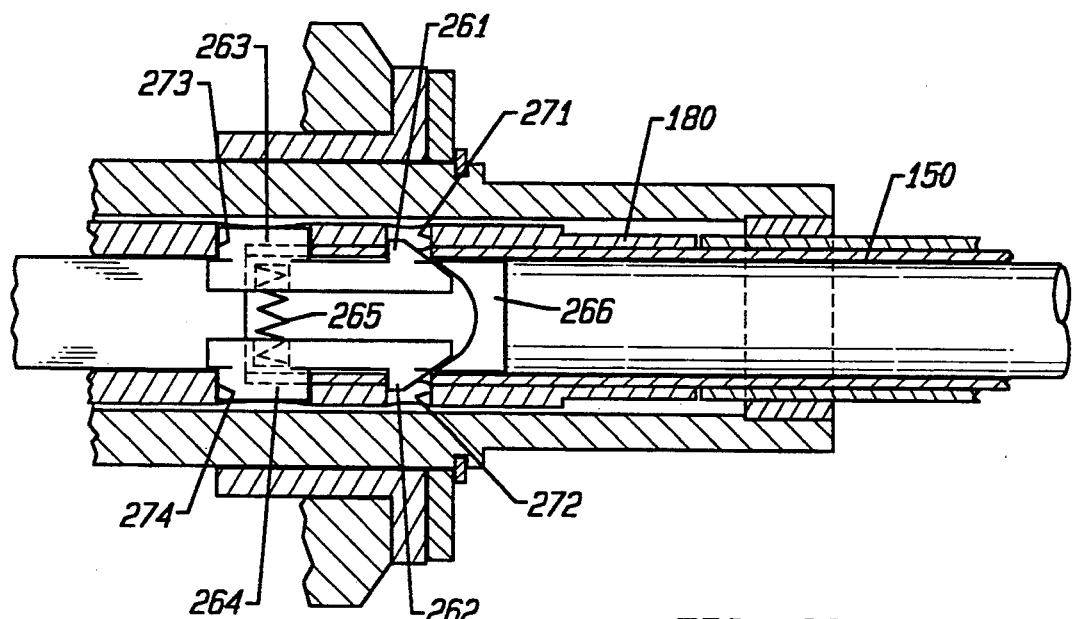
FIG. 28 is a sectional view of the coring tube mounting mechanism showing a coring tube mounted for normal operation.
Figure 29:
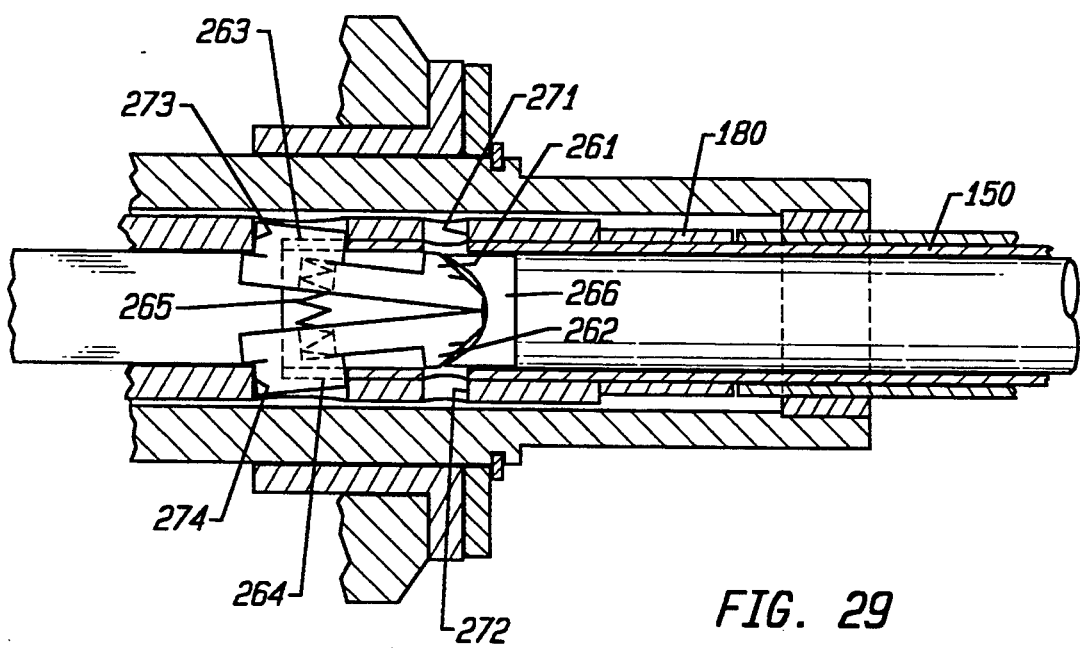
FIG. 29 is a sectional view of the coring tube mounting mechanism as the coring tube has been pressed inwardly to detach the coring tube from its mounting.

FIGS. 27–30 show in detail the removable coring and seed celling tubes according to the present invention. Since the coring and seed celling tubes occasionally become bent or otherwise unusable, it is highly beneficial to have a coring tube and seed celling tube assembly which is readily removable and replaceable. FIG. 27 shows the replaceable coring and seed celling tube assembly 350 which includes coring tube 150 and seed celling tube 180, and turning fins 153 and 154 and seed celling knives 171 and 172. The assembly 350 has been separated from the coring tube drive mechanism 250. The detachable mounting means is shown generally as 260 and includes a pair of spring loaded dogs 261 and 262 carried by the coring tube drive means 250, which engage a pair of holes 271 and 272 formed in the surface of coring tube 150 and seed celler support tube 180. Additionally, a second pair of dogs, 263 and 264 engage a pair of U shaped openings 273 and 274 formed in the proximal end of coring tube 150 and seed celler support tube 180 (FIGS. 28,29).

Figure 30:
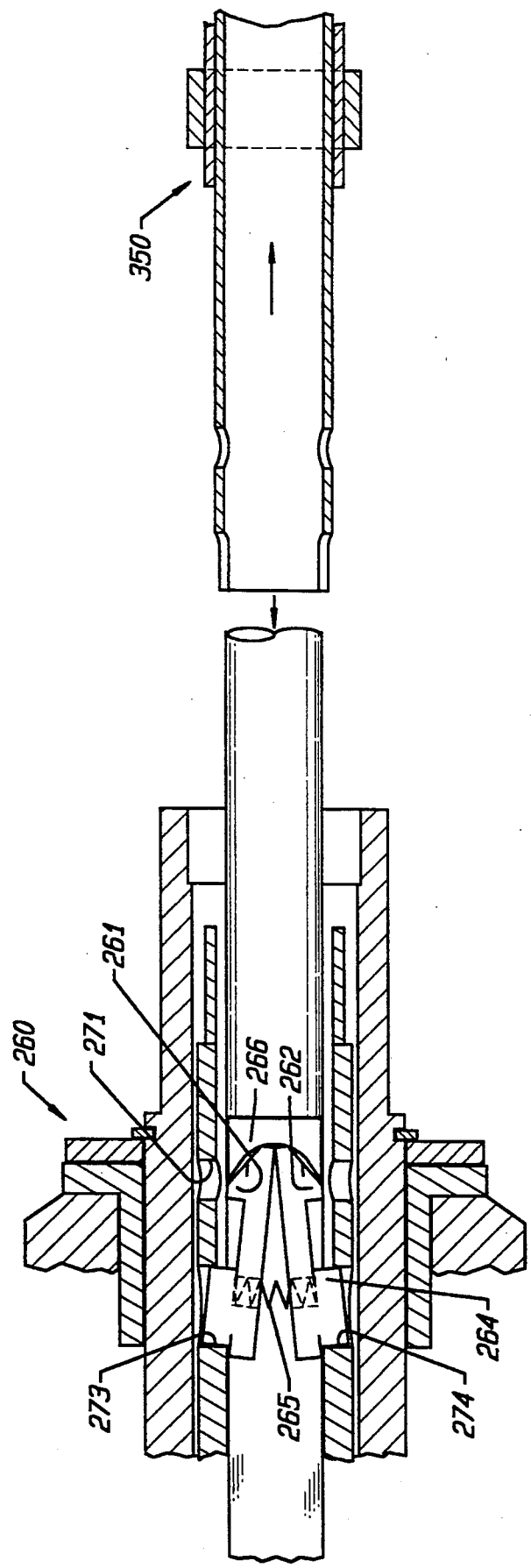
FIG. 30 is a sectional view of the coring tube mounting mechanism showing the replaceable coring tube being removed from its mounting.

FIG. 28 shows the unit in normal operation with the dogs 261 and 262 fully engaged in holes 271 and 272 and dogs 263 and 264 fully engaged in the U shaped recesses 273 and 274. The dogs are maintained in the position shown in FIG. 28 by spring 265. In order to remove the assembly 350, a tool is inserted into the end of hollow coring tube 150 and pressed against the solid wedged shaped piece 266 which, as it is driven to the left, pulls dogs 261 and 262 inwardly as shown in FIG. 29 so that the coring and seed celling tube assembly 350 may be separated from the core tube drive mechanism 260 as shown in FIG. 30. A new assembly 350 can thereafter be snapped into position. The time required to remove and replace assembly 350 in this fashion is merely a matter of seconds.

What is claimed is:

1. In an automatic pear processing apparatus wherein whole pears are impaled on a coring tube and are peeled, stem trimmed, cored and seed celled in a first time interval while so impaled, and wherein the usable, fleshy body of said whole pear is knocked off said coring tube in a second time interval, and wherein said peel, stem, core and seed cell of each pear are considered waste to be separated from the usable fleshy body of each pear, the improvement comprising:

a generally U-shaped container positioned adjacent said coring tube, said container having an open end formed by two parallel wall portions of said U-shape and a closed end formed by a bottom curved wall portion of said U-shape, a blade carried by said U-shaped container, a first conveyor located below said coring tube for receiving waste product, a second conveyor located adjacent said first conveyor for receiving said usable portions of said processed pears, and an inclined chute located above said second conveyor, said chute having side walls, said side walls having top portions of which define an upper opening of said chute, said U-shaped container having a first position during said first time interval wherein the closed end of said U-shaped container is disposed above said open end and wherein the open end of said U-shaped container is positioned above and surrounds the upper opening of said chute and having a second position during said second time interval wherein the open end of said U-shaped container is disposed above said closed end and said U-shaped container is horizontally aligned with said coring tube, so that as said pear is knocked off said coring tube, said pear is forced through said blade into said U-shaped container.

2. The apparatus of claim 1 wherein said U-shaped container is carried by a shaft and is rotated about said shaft between said first and second positions, and wherein the motion from said second position to said first position is abrupt in order to fling the sliced pear downwardly against said chute to separate the seed cell from the usable portion of each pear.

* * * * *